(12) United States Patent
Debique et al.

(10) Patent No.: US 7,191,190 B2
(45) Date of Patent: *Mar. 13, 2007

(54) META DATA MANAGEMENT FOR MEDIA CONTENT OBJECTS

(75) Inventors: Kirt A. Debique, Seattle, WA (US); David E. Stewart, Kirkland, WA (US); Gabriel S. DeBacker, Carnation, WA (US); Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

This patent is subject to a terminal disclaimer.

(21) Appl. No.: 09/820,088

(22) Filed: Mar. 27, 2001

(65) Prior Publication Data

US 2002/0184180 A1 Dec. 5, 2002

(51) Int. Cl.
*G06F 17/00* (2006.01)
*G06F 15/16* (2006.01)
*G06F 15/00* (2006.01)
*G06F 12/00* (2006.01)

(52) U.S. Cl. .................. 707/104.1; 707/201; 709/231; 715/512

(58) Field of Classification Search ............ 707/104.1, 707/100–102, 1–10, 200; 767/500.1; 709/23.1, 709/231, 203; 715/500.1, 51
See application file for complete search history.

(56) References Cited

U.S. PATENT DOCUMENTS 5,464,946 A * 11/1995 Lewis .......................... 84/609
5,813,014 A * 9/1998 Gustman ................. 707/103 R (Continued)

OTHER PUBLICATIONS

"Description of the Features in Microsoft Plus! 98," Microsoft Plus! 98, version 1.0, from http://support.microsoft.com/support/kb/articles/Q269/0/44.ASP, printed Mar. 7, 2001, 2 pages.

(Continued)

*Primary Examiner*—John Cottingham
*Assistant Examiner*—Miranda Le

(57) ABSTRACT

Meta data associated with multiple pieces of content (e.g., songs, movies, other audio/video clips, etc.) stored on multiple pieces of media (e.g., CDs, DVDs, etc.) is maintained in a meta data store. The meta data store also includes meta data associated with other pieces of content stored elsewhere, such as songs stored in files on a local hard drive that have been ripped from a CD or DVD. These other pieces of content are associated with the content on the pieces of media, such as being ripped versions of the same song tracks. This association is maintained in the meta data store, so that whenever a change is made to meta data for one piece of content (e.g., for a track on a CD), then the meta data for the associated piece(s) is also changed (e.g., the ripped version stored in a file on the hard drive).

39 Claims, 8 Drawing Sheets

U.S. PATENT DOCUMENTS

| | | | |
|---|---|---|---|
| 5,833,469 A * | 11/1998 | Ito et al. | 434/307 A |
| 5,845,104 A * | 12/1998 | Rao | 711/113 |
| 5,893,095 A * | 4/1999 | Jain et al. | 707/6 |
| 6,061,680 A | 5/2000 | Scherf et al. | 707/3 |
| 6,118,450 A | 9/2000 | Proehl et al. | 345/349 |
| 6,356,971 B1 * | 3/2002 | Katz et al. | 710/301 |
| 6,411,724 B1 * | 6/2002 | Vaithilingam et al. | 382/100 |
| 6,505,160 B1 * | 1/2003 | Levy et al. | 704/270 |
| 6,564,263 B1 * | 5/2003 | Bergman et al. | 709/231 |
| 6,760,721 B1 * | 7/2004 | Chasen et al. | 707/3 |
| 2005/0047756 A1 * | 3/2005 | Evans | |

OTHER PUBLICATIONS

Windows 98 Highlights: Adding Microsoft Plus! 98 to Windows 98, "Running Windows? See what you can add with Microsoft Plus! 98." Oct. 16, 1998, 2 pages.

Microsoft Windows 98 Home Pages, "Having Fun-Info for Multimedia Aficionados," last updated Apr. 21, 1999, 2 pages.

* cited by examiner

220

```xml
<?xml version="1.0" encoding="UTF-8" ?>
- <OMI xmlns:sql="urn:schemas-microsoft-com:xml-sql">
    <name>Billboard Top Hits: 1983</name>
    <author>Various Artists</author>
    <releasedate>1992</releasedate>
    <genre>ROCK</genre>
    <style>Pop/Rock</style>
    <rating>8</rating>
    <copyright />
    <label>Rhino</label>
    <parent>AMG</parent>
  + <track>
  - <track>
      <name>Africa</name>
      <author>Toto</author>
    </track>
  - <track>
      <name>Stray Cat Strut</name>
      <author>Stray Cats</author>
    </track>
           .
           .
           .
  </OMI>
```

*Fig. 4*

META DATA MANAGEMENT FOR MEDIA CONTENT OBJECTS

TECHNICAL FIELD

This invention relates to data structures and data management, and more particularly to meta data management for media content objects.

BACKGROUND

Computers are becoming increasingly more powerful while at the same time becoming less costly. This has resulted in the increased presence of computers into many homes and business throughout the world. Along with this increase in computing performance and popularity has also come an increase in the number of areas in which computers are used. Where once computers were used primarily for productivity-based applications (e.g., databases, word processing, spreadsheets, and so forth), a wide range of entertainment applications have become increasingly popular.

One such entertainment application is that of media content playback, such as audio (e.g., songs) and audio/video (e.g., movies) playback. For example, computers are often equipped with a CDROM drive that allows the computer to read an audio CD and play the songs on the CD via one or more speakers coupled to the computer. An additional feature that such an entertainment application may provide is the ability to obtain information about a CD (e.g., track names and artist name(s)). This information is commonly referred to as "meta data" corresponding to the CD. The application accesses a database of meta data (e.g., from a remote server) to identify information about the CD (e.g., track names and artist name(s)), and then displays this information to the user.

In addition to playing back media content directly from the source CD, some applications also allow songs to be copied from the source CD and stored as separate files on a local hard drive of the computer, such as in an MP3 or WMA format. This process is commonly referred to as "ripping". These locally stored files can then be played back at a subsequent time directly from the local hard drive without the presence of the source CD in the CDROM drive.

One current problem with these systems, however, is that meta data is typically associated with only one source (e.g., the source CD). Thus, if the user plays back a song directly from a CD, then the meta data corresponding to that CD is displayed to the user. Similarly, if the user rips that same song to a file on the local hard drive and plays that song back from the file on the hard drive, then the meta data corresponding to that file is displayed to the user. However, any changes made (e.g., by the user) to the meta data corresponding to the CD are displayed to the user only when the song is played back directly from the CD, and any changes made to the meta data corresponding to the file are displayed to the user only when the song is played back from the file. Thus, multiple different sets of meta data are created (one for each source) for each song, requiring any changes to the meta data for a song to be made to each of the multiple sets. This creates an inconsistent and unfriendly user experience.

The invention addresses these problems and provides solutions to improve meta data management for media content objects.

SUMMARY

Improved meta data management for media content objects is described herein.

According to one aspect of the improved meta data management, meta data associated with multiple pieces of content (e.g., songs, movies, other audio/video clips, etc.) stored on multiple pieces of media (e.g., CDs, DVDs, etc.) is maintained in a meta data store. The meta data store also includes meta data associated with other pieces of content stored elsewhere, such as songs stored in files on a local hard drive that have been ripped from a CD or DVD. These other pieces of content are associated with the content on the pieces of media, such as being ripped versions of the same song tracks. This association is maintained in the meta data store, so that whenever a change is made to meta data for one piece of content (e.g., for a track on a CD), then the meta data for the associated piece(s) is also changed (e.g., the ripped version stored in a file on the hard drive).

According to another aspect of the improved meta data management, meta data is organized using a disc-centric tree structure, with a disc object being a root object in the tree and multiple children objects (e.g., corresponding to tracks, files, play lists, and so forth) spawning from the disc object. These children can also have their own children object (e.g., file objects). Meta data is maintained for all of these objects, and any changes to the meta data can be readily propagated through the tree to other objects corresponding to the same disc object (the root object).

According to another aspect of the improved meta data management, meta data is maintained for both generally available media and user-created media. Meta data for generally available media (e.g., commercially available CDs or DVDs) can be obtained from a remote server. For user-created media, the computer creating the media has access to the meta data associated with the content of the new media (e.g., songs copied from another CD for which meta data is already available). The computer generates a disc identifier for the user-created media and, for each piece of content on the new media, copies the meta data for that content from the meta data associated with the source of the content (e.g., for a song copied from a CD, the meta data associated with that song corresponding to that CD).

BRIEF DESCRIPTION OF THE DRAWINGS

The present invention is illustrated by way of example and not limitation in the figures of the accompanying drawings. The same numbers are used throughout the figures to reference like components and/or features.

FIG. 4 illustrates an exemplary return of meta data from a meta data server.

DETAILED DESCRIPTION

Figure 1:
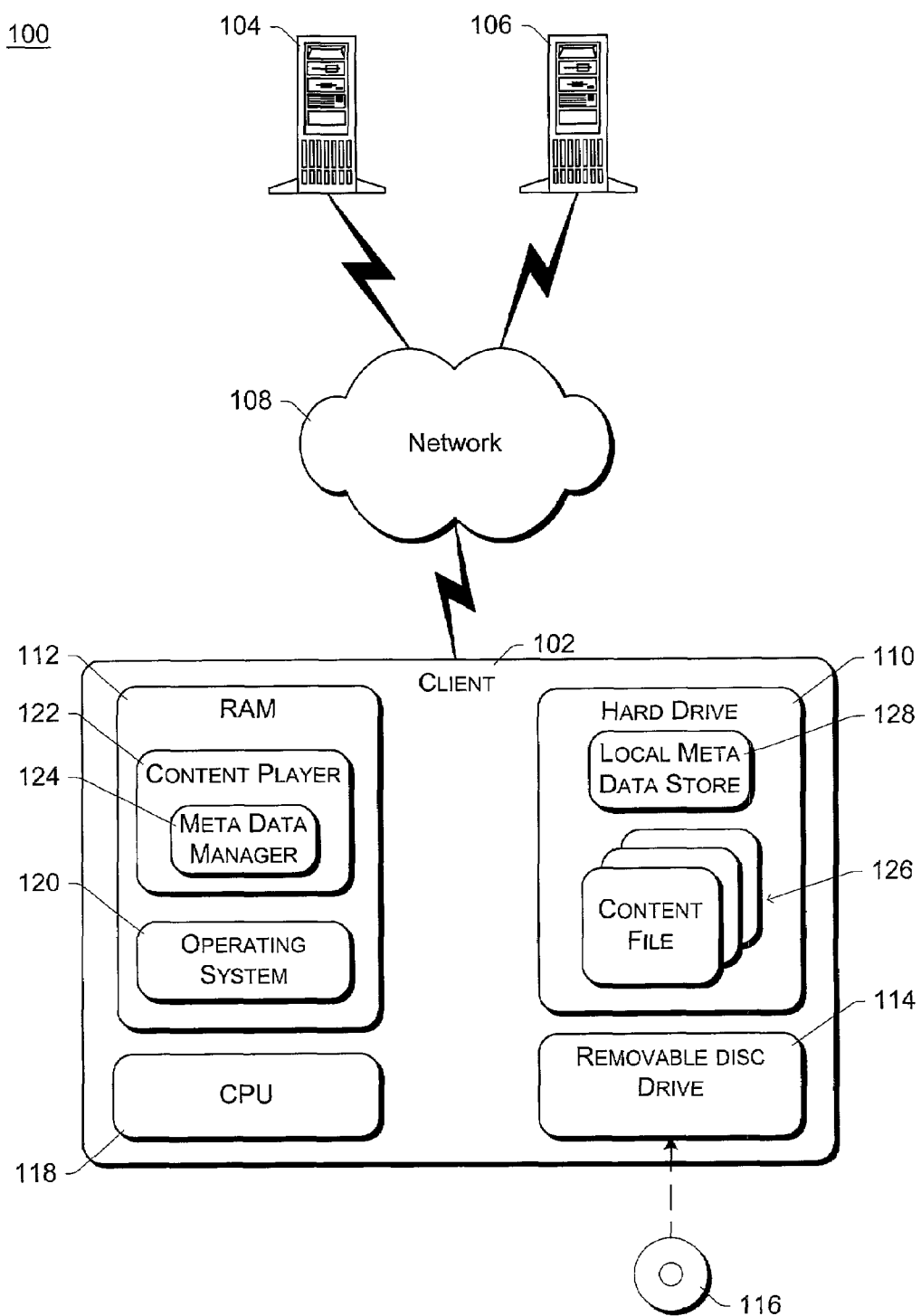
FIG. 1 is a block diagram illustrating an exemplary network environment.

FIG. 1 is a block diagram illustrating an exemplary network environment 100. Environment 100 includes a client computer 102, remote server computers 104 and 106, and a network 108. Network 108 represents any of a wide variety of conventional data communications networks. Network 108 may include public portions (e.g., the Internet) as well as private portions (e.g., an internal corporate Local Area Network (LAN) or a home network), as well as combinations of public and private portions. Network 108 may be implemented using any one or more of a wide variety of conventional communications media including both wired and wireless media. Any of a wide variety of communications protocols can be used to communicate data via network 108, including both public and proprietary protocols. Examples of such protocols include TCP/IP, IPX/SPX, NetBEUI, etc.

Computers 102, 104, and 106 represent any of a wide range of computing devices, and each device may be the same or different. By way of example, devices 102–106 may be desktop computers, multiple-processor fileservers or workstations, laptop computers, handheld or pocket computers, personal digital assistants (PDAs), cellular phones, Internet appliances, consumer electronics devices, gaming consoles, and so forth.

Client computer 102 includes a local hard drive 110, a system memory (Random Access Memory (RAM)) 112, a disc drive 114 for removable media 116, and a central processing unit (CPU) 118. CPU 118 executes an operating system 120, which manages operation of client computer 102 and provides support for input/output operations (e.g., user inputs, audio and/or video input and playback, data communications with other computers via network 108, and so forth). CPU 118 also executes a content player application 122 from memory 112. Content player application 122 provides a user interface allowing a user of computer 102 to select various pieces of media content (also referred to as simply "content") for playback. Content player application 122 also communicates audio data to speakers of computer 102 (optionally via operating system 120) for playing to the user, as well as communicates video data to a display device of computer 102 for playback of video data. Additionally, content player application 122 may also present (e.g., display) to the user meta data corresponding to content being played. This meta data is information describing different aspects or characteristics of the content being played, and/or information related to the content being played. A meta data manager component 124 of content player application 122 manages the storage and modification of meta data, as discussed in more detail below. Although illustrated as separate components, content player 122 and operating system 120 may alternatively be incorporated into the same component (e.g., content player 122 may be one of multiple modules of operating system 120).

Content player application 122 can play pieces of content directly from media 116 inserted into disc drive 114. A piece of content as used herein refers to a segment of data that can be played (e.g., to a user on a computer). The exact nature of a piece of content on media 116 is dependent on the type of media as well as the type of content. For example, for an audio CD, each track of audio data (typically a single song) would be a piece of data. For a movie DVD, the entire movie may be one piece of content, a set of outtakes another piece of content, and a movie preview a third piece of content.

Media 116 can be any of a wide variety of conventional media. As used herein, media 116 is discussed primarily with reference to being a compact disc (CD) or digital versatile disc (DVD), including CDs and DVDs that are read only, rewriteable, or recordable. Alternatively other types of media can be used, such as other types of optical discs, magnetic disks, magnetic tapes, solid state storage devices, and so forth. It is to be appreciated that the nature of drive 114 also varies based on the type of media 116 being used (e.g., an optical disc drive, a magnetic tape drive, and so forth).

Additionally, client 102 may access other media in a manner analogous to accessing media 116. For example, media 116 may be inserted into a disc drive of another computer (or CD "jukebox") and accessed by client 102 via network 108. By way of another example, an Internet radio station may make tracks of data, analogous to tracks of data on a CD, accessible to client 102.

In addition to being used as a direct source for content playback, media 116 may be used as the source for content that is stored as one or more files on hard drive 110. Content player application 122 can manage the copying (ripping) of content from media 116 to a file 126 of hard drive 110, or alternatively another component such as operating system 120 or a component on another computer (not shown) may manage the copying. Each of these ripped files is another version of the corresponding piece of content from media 116. Each of the content files 126 typically stores a single piece of content, and may use any of a wide variety of public and/or proprietary formats, such as MPEG Audio Layer 3 (MP3), Windows Media audio file (WMA), and so forth.

During operation, meta data manager 124 maintains a record (explicitly or implicitly) of different media pieces 116, such as different CDs, that are inserted into disk drive 114. When coupled to network 108, meta data manager 124 communicates with server 104 and/or 106 to retrieve meta data corresponding to the different media 116 that has been inserted into disc drive 114. Meta data manager 124 stores this received meta data locally (e.g., as local meta data store 128 on hard drive 110) for subsequent use by content player application 122.

Content player application 122, including meta data manager 124, provides an enhanced content playback experience by presenting, to the user, meta data corresponding to various pieces of content. The meta data can be displayed while the content is being played, as well as at other times (e.g., allowing the user to look back through content that he or she has previously played). Meta data manager 124 obtains (from server 104 and/or 106) meta data for each piece of content (e.g., each song) on a particular piece of media (e.g., each CD) that has been inserted into disc drive 114. This meta data is obtained even though the user may not have actually played the corresponding content—the mere insertion of the media is sufficient. In the illustrated example meta data manager 124 obtains only the meta data for pieces of media it is aware of (e.g., those that have been inserted into disc drive 114). Alternatively, other meta data may also be obtained and is stored in local meta data store 128. For example, a user may identify a preferred artist and all meta data available for all of that artist's CDs may be obtained and stored in local meta data store 128.

Meta data manager 124 associates meta data with the particular pieces of removable media 116 and further associates all pieces of content (e.g., songs, movies, and so forth) that are on or originate from particular media 116 with that particular media 116. Thus, meta data for a particular song from a particular disc is associated with that song, regardless of whether it is played to the user directly from media 116 or from one of content files 126 that was ripped from media 116.

In the illustrated example, the meta data is stored at servers 104 and 106 and is available from a "disc-centric" point of view. This "disc-centric" point of view organizes meta data on a per-disc basis, with tracks on that disc and files ripped from those tracks corresponding to the particular disc. A disc identifier is used for tracking the meta data for the disc. In the case of CDs, CDs typically store songs as different tracks on the CD, and each track is made up of multiple "frames" of audio data. In one implementation, each frame of audio data is 1/75 of a second. Typical audio CDs store table of contents (TOC) information, which refers to: the total number of tracks on the disc, the starting frame offset of each track, and the total number of frames on the disc. The disc identifier is generated by summing together this table of contents information (the total number of tracks on the disc, the starting frame offset of each track, and the total number of frames on the disc). It should be noted that generating a disc identifier in this fashion does not guarantee that each disc identifier is unique. However, it does provide an almost-unique value (that is, it is possible for two different CDs to have the same disc identifier, but highly unlikely).

Alternatively, the disc identifier may be generated in different manners for CDs, as well as different manners for different types of media. For example, a disc identifier for a DVD may be generated based on a CRC 64 (64-bit Cyclical Redundancy Checking) of portions of the DVD. In one implementation, these portions are the first parts (e.g., 64 Kb) of the video_ts.ifo and the vts_01_0.ifo on a DVD disc.

When meta data manager 124 desires meta data for a particular disc, manager 124 communicates the disc identifier to one of servers 104 and 106. The receiving server 104 or 106 uses the disc identifier as an index into the meta data stored at the server. If the disc identifier matches a disc identifier at the server, then the meta data associated with that matching server is returned to meta data manager 124.

Servers 104 and 106 can store public and/or private meta data. Public meta data refers to data that is generally available to the public as a whole (although possibly subject to licensing fees or other restrictions). Private meta data refers to data that is intended for only a particular one or more users. For example, a user may generate his or her own meta data and communicate it to a server as private meta data. Subsequent accesses to the server by the user (the identity of which can be verified in any of a variety of conventional manners, such as a user name and password) allow this meta data to be received. By storing such private meta data on a server, a user can generate his or her own data and have that data "follow" him or her to different locations. For example, a user may generate private meta data from his or her home computer and store it on a remote server. The user can then access that server from another location (e.g., his or her portable audio device, an Auto PC, and so forth) and have that previously generated private data available at the other location. Thus, if the user generates special meta data for a CD on his or her home computer, when the user inserts the CD into his or her Auto PC, the same special meta data can be retrieved from the server and rendered by the Auto PC.

Content player 122 maintains a tree-structure of objects associated with particular media 116. In the illustrated examples, this tree-structure is a "disc-centric" structure placing a disc identifier as the root node and then one or more levels of children depending from the root node.

Figure 2:
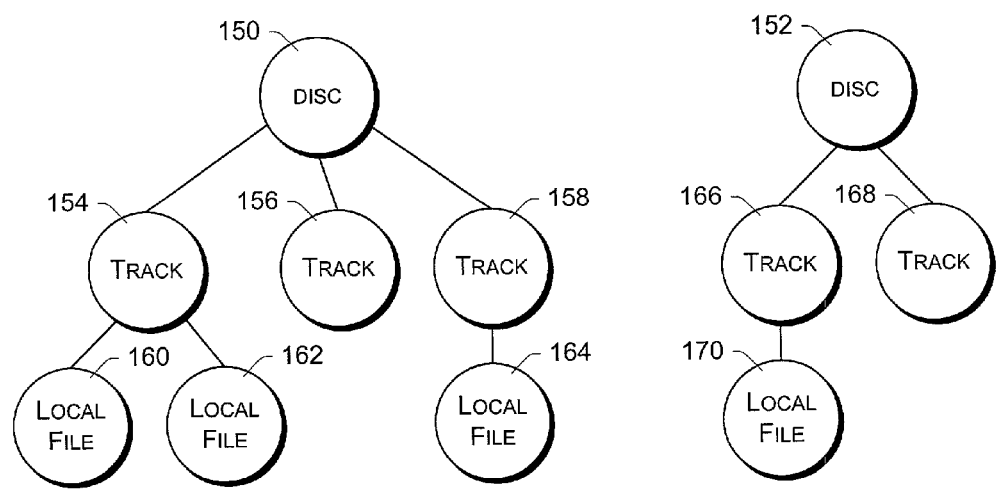
FIG. 2 illustrates an exemplary tree structure of media content objects associated with particular media.

FIG. 2 illustrates an exemplary tree structure 148 of media content objects associated with particular media. Each object in tree structure 148 can have meta data associated with it. Two root node objects 150 and 152 are illustrated, each corresponding to a particular optical disc. Root object 150 has three children objects 154, 156, and 158, each of which is one track on the disc corresponding to object 150. Additionally, track object 154 has two children 160 and 162, each of which is a file that has been ripped to a local hard drive, and each of which is a ripped version of the track corresponding to track object 154. Furthermore, track object 158 has one child 164, which is a file that is stored on the local hard drive and is a ripped version of the track corresponding to track object 158. The track corresponding to track object 156 has not been ripped to any files on the local hard drive, and thus track object 156 does not have any children.

Similarly, two track objects 166 and 168 are child objects from root disc object 152. Track object 166 has a file child object 170, while track object 168 has no children.

The tree structure of FIG. 2 allows meta data manager 124 to readily propagate meta data, as well as changes to meta data, through the various objects associated with a particular disc (or other media). For example, if a user desired to correct a typographical error that occurred in the name of a song corresponding to track 154, given the relationships identified in FIG. 2 the association of ripped file objects 160 and 162 to track object 154 can be readily identified, and the correction also made in the name of the song corresponding to each of the ripped file objects 160 and 162.

The discussions herein refer primarily to a disc-centric point of view as illustrated in FIG. 2. Alternatively, the database may be structured from other view points. For example, rather than the disc object as a root node there may be an "anthology" object as the root node, with each of the disc objects 150 and 152 being children of the anthology object. An anthology may include, for example, a set of multiple CDs corresponding to the same artist, genre, time period, etc. In this situation, any meta data changes can be propagated across multiple CDs (e.g., a performance date for the anthology may be changed and this change propagated to each CD in that anthology). By way of additional examples, other points of view may have artist names as root nodes, genres as root nodes, and so forth.

Additionally, it should be noted that even though a disc-centric point of view is used, an object can be a child of objects that are (or lead to) two different root node objects. For example, as discussed in more detail below, a new CD may be created by a user that includes tracks from another source CD. In this situation, the track objects can be linked to parent root node objects that are the root nodes for both the new CD as well as the source CD.

The tree structure of FIG. 2 can be implemented using any of a wide variety of data structures.

Figure 3:
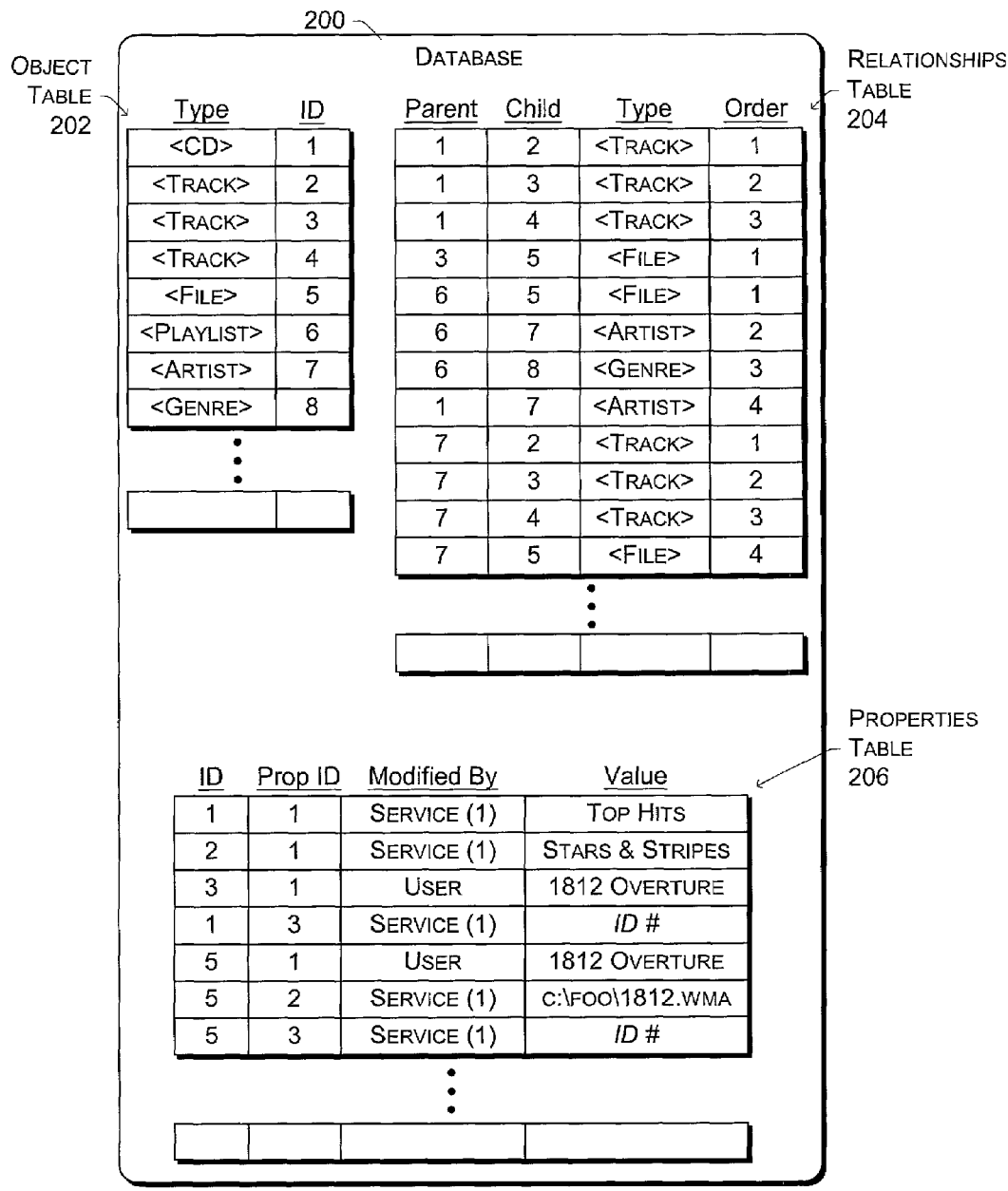
FIG. 3 illustrates an exemplary database that implements the tree structure of FIG. 2.

FIG. 3 illustrates an exemplary database 200 that implements the tree structure of FIG. 2. Database 200 is illustrated including an object table 202, a relationships table 204, and a properties table 206. Object table 202 identifies multiple objects in database 200, relationships table 204 maintains a mapping of objects to each other in a specific order, and properties table 206 maintains a set of properties (meta data) for objects in database 200. FIG. 3 illustrates database 200 populated with example data for purposes of explanation.

Object table 202 identifies the objects that are in database 200. As used herein, an object refers to an entity that can have "children" (that is, one or more other related objects) and properties associated with it. For example, an object may be a disc, a track on a disc, a file ripped from a track on a disc, a play list identifying multiple tracks and/or files, an artist (corresponding to a disc, a track, a file, etc.), a genre (corresponding to a disc, a track, a file, etc.), and so forth. In the illustrated example of FIG. 3, several different objects are identified.

Object table 202 includes two fields: a type field and an ID field. For each entry in object table 202, the type field identifies what type of object is described in the entry and the ID field identifies a unique identifier (unique within database 200) of the object. In one implementation, the type field includes a globally unique ID that corresponds to the type of object described in the entry. The ID for an object is used to identify the object in the relationships table 204 and properties table 206. The ID for each object can be assigned in any of a wide variety of manners, and in the illustrated example each object is assigned an ID that is the order the object is entered into object table 202 relative to the other objects in the table. In the illustrated example of FIG. 3, a CD is assigned the ID of "1", three CD tracks are assigned the ID's of "2", "3", and "4", respectively, a file is assigned the ID of "5", and so forth.

Additional fields may also optionally be included in object table 202. For example, a "description" field may be adding allowing information describing the entry to be included (e.g., a brief description of what object the globally unique ID refers to, such as "compact disc").

Relationships table 204 identifies relationships between different objects in database 200. Each entry in relationships table 204 identifies a parent/child relationship between two objects identified in object table 202. Relationships table 204 includes four fields: a parent field, a child field, a type field, and an order field. The parent field identifies one of the objects in object table 202 by its ID, while the child field identifies another of the objects in object table 202 by its ID. The parent and child fields identify a parent/child relationship between these two identified IDs. For example, the first entry in relationships table 204 indicates that the object with an ID of 2 is a child of the object with an ID of 1. Thus, in conjunction with object table 202, this first entry indicates that the track with an ID of 2 is a child of the CD with an ID of 1 (in other words, the track with an ID of 2 is a track on the CD with an ID of 1).

The type field in relationships table 204 indicates what type of object the object referenced in the child field of the entry is. For example, the first entry indicates that the object with an ID of 2 is a track object. This is a duplicate of the information stored in object table 202, and is included to increase efficiency in accessing database 200. For example, to identify all of the tracks with the same parent, a search can be performed based on the parent and type fields of relationships table 204. Alternatively, the type field may not be included in relationships table 204.

The order field in relationships table 204 identifies the order in which each entry for each parent object is added to relationships table 204. The first relationship entered in table 204 for a particular parent object has an order of "1", the second has an order of "2", and so forth.

Additional fields may also optionally be included in relationships table 204. For example, an additional type field may be included that indicates what type of object the object referenced in the parent field of the entry is. By way of another example, a User ID field may be included that identifies which user inserted the CD that resulted in the relationship for that entry. The User ID field may be used, for example, to allow meta data for multiple different users to be stored in the same database 200, but also allow a particular user to access only the meta data that corresponds to discs he or she inserts into the disc drive.

Properties table 206 stores meta data for the objects identified in object table 202. Properties table 206 includes four fields: an ID field, a property (prop) ID field, a "modified by" field, and a value field. For each entry, the ID field identifies one of the objects in object table 202 by its ID. The property ID field for the entry identifies a particular property that the entry corresponds to. Multiple pieces of meta data can be associated with an object (e.g., the title of a CD, the artist of a CD, a performance date, and so forth). Multiple property ID values are established that uniquely identify the different possible pieces of meta data, and for each entry the property ID field includes one of those ID values.

The "modified by" field identifies the source of the meta data for the entry. The modified by field may indicate a particular service that is the source of the meta data (e.g., one of servers 104 or 106 of FIG. 1), or alternatively that the user is the source of the meta data. The value field identifies the meta data for the entry. Any of a variety of meta data can be stored in the value field, and optionally may be modified by the user. For example, properties table 206 indicates that the object having an ID of 3 (which is a CD track) has a user-set value of "1812 Overture".

Although illustrated as a single field, the value field may optionally be multiple data-dependent fields (e.g., a numeric value field, a text value field, a date value field, and a binary value field).

The meta data illustrated in database 200 can be received from a remote server, such as server 104 or 106 of FIG. 1. This meta data can be returned to the client computer implementing database 200 in any of a wide variety of formats. FIG. 4 illustrates an exemplary return of meta data from a meta data server. The meta data 220 illustrated in FIG. 4 is returned in an extensible markup language (xml) format. Alternatively, other public and/or proprietary formats can be used. As illustrated, meta data 220 indicates that the name of the disc is "Billboard Top Hits: 1983", the author is "Various Artists", the release date for the disc is "1992", the genre of the disc is "rock", the style of the disc is "Pop/Rock", and the rating of the disc is "8". Additionally, there is no copyright information in meta data 200 for the disc, indicating that the remote server does not have the copyright meta data for the disc. Additionally, the tracks of the disc are identified in meta data 220 in order, so the first track on the disc has the name "Africa" and the author "Toto", the second track on the disc has the name "Stray Cat Strut" and the author "Stray Cats", and so forth.

Returning to FIG. 3, the various tables in database 200 allow changes to the meta data in the database to be automatically propagated to other related objects. For example, assume that the meta data received from a server 104 or 106 of FIG. 1 for the object having an ID of 3 (a CD track) indicates that the title is "Tchaikovsky: 1812 Overture". Further assume that the user changes the title for that track to be simply "1812 Overture". The meta data manager then checks relationships table 204, which indicates that the object having an ID of 3 has a child with an ID of 5 (a file, as indicated in object table 202). The meta data manager thus also changes the title data, in properties table 206, for the object having an ID of 5 to be the new title. Thus, regardless of whether the user subsequently selects playback of Tchaikovsky's 1812 Overture from the CD or the file, the meta data stored in database 200 indicates that the title is simply "1812 Overture".

Additional fields may also optionally be included in properties table 206. For example, a type field may be included (analogous to the type field in relationships table 204) that identifies what type of object the object referenced in the ID field is. By way of another example, properties for particular objects may be organized into different property sets, such as pre-defined properties and user-defined properties. In this situation, an additional field may be included in properties table 206 that identifies which property set the entry refers to.

In addition to tables 202, 204, and 206, one or more additional tables may optionally be included in database 200. In one implementation, these additional tables include a property set types table, a property types table, a users table, and an object values table. Each entry in the property set types table identifies a globally unique ID for a property set, a corresponding ID for that property set, and a description of that property set. Each entry in the property types table identifies one of the property set ID's from the property set types table, a number associated with the property ID, a data type associated with the property (e.g., a numeric value, a text value, a date value, or a binary value), and a description of the property. Each entry in the users table identifies a user ID and corresponding user name of the computer on which database 200 is implemented. Each entry in the object values table identifies an object ID from object table 202, an instance number of the object in the object values table, and optionally an identification of the user that created the object (e.g., a sequential ID based on the user's logon name).

Exemplary objects and properties are illustrated in FIG. 3, although a wide range of objects and associated properties may be included in database 200. The following tables illustrate an exemplary set of objects and the properties that may be associated with those objects in accordance with certain implementations. Additionally, the attached Appendix identifies a set of interfaces and functions that can be used in accordance with certain implementations to create, manage, and modify different schemes (e.g., different databases 200 of FIG. 3), and objects within those schemes.

| Object Types | |
|---|---|
| Description | |
| Object Name | |
| Genre | The genre or category of the content. |
| CDGenre | The genre or category of a CD. |
| CDArtist | The artist of a CD. |
| CDAlbum | A CD album. |
| Artist | The artist of content. |
| UserCollection | A user-defined collection of content. |
| Album | An album. |
| AlbumTrack | A track of an album. |
| AlbumPlaylist | A play list for an album. |
| Playlist | A play list of content. |
| PlaylistFromAlbum | A play list of ripped tracks associated with an album. |
| Track | A track of content on media. |
| Batch | A list of disc(s) for which meta data has not been downloaded yet (allowing for batch processing of downloads when network connection is made). |
| Link | A URL reference and friendly name about an object. For example, "More about Sting" would be a friendly name and the URL reference would be "http://. . . .sting.com". |
| Picture | An image corresponding to content. |
| ChildListEntry | A list of the children tracks in a play list. |
| DVD | A DVD. |
| DVDTitle | The title of a DVD. |
| DVDChapter | A chapter of a DVD. |
| Factoid | One or more facts or comments associated with an album or content. Different factoids may be tied to different frames or other segments of the album or content. |
| Property Name | |
| Genre Object | |
| Name | The name of the genre. |
| NumMediaChildren | The total number of children of the object that are media content. |
| NumAudioMediaChildren | The total number of children of the object that are audio media content. |
| NumVideoMediaChildren | The total number of children of the object that are video media content. |
| CDGenre Object | |
| Name | The name of the genre or category of a CD. |

-continued

Object Types

| | Description |
|---|---|
| CDArtist Object | |
| Name | The name of an artist of a CD. |
| Role | The role of an artist of a CD (e.g., lead singer, backup singer, keyboard, etc.). |
| CDAlbum Object | |
| Title | The title of the CD. |
| Copyright | Copyright information for the CD. |
| Label | The recording company label that produces the CD. |
| ReleaseDate | The date of release of the CD. |
| Rating | A rating for the CD. |
| RatingOrg | An organization that rated the CD. |
| CDID | A hashed value of the disc identifier, allowing for faster lookups. |
| TOC | The disc identifier (based on the table of contents information) for the CD. |
| LastPlayed | The last time a track of the CD was played on the computer. |
| Artist | The artist of the CD. |
| Genre | The genre or category of the CD. |
| NumMediaChildren | The total number of children of the object that are media content. |
| NumAudioMediaChildren | The total number of children of the object that are audio media content. |
| NumVideoMediaChildren | The total number of children of the object that are video media content. |
| Artist Object | |
| Name | The name of an artist of a CD. |
| Role | The role of an artist of a CD (e.g., lead singer, backup singer, keyboard, etc.). |
| NumMediaChildren | The total number of children of the object that are media content. |
| NumAudioMediaChildren | The total number of children of the object that are audio media content. |
| NumVideoMediaChildren | The total number of children of the object that are video media content. |
| UserCollection Object | |
| Name | The name of the user-defined collection of content. |
| Album Object | |
| Title | The title of the album. |
| Copyright | Copyright information for the album. |
| Label | The recording company label that produces the album. |
| ReleaseDate | The date of release of the album. |
| Rating | A rating for the album. |
| RatingOrg | An organization that rated the album. |
| CDID | A hashed value of the disc identifier for the album, allowing for faster lookups. |
| TOC | The disc identifier (based on the table of contents information) for the album. |
| LastPlayed | The last time content from the album was played on the computer. |
| Artist | The artist of the album. |
| Genre | The genre or category of the album. |
| NumMediaChildren | The total number of children of the object that are media content. |
| NumAudioMediaChildren | The total number of children of the object that are audio media content. |
| NumVideoMediaChildren | The total number of children of the object that are video media content. |
| AlbumTrack Object | |
| Title | The title of a track of the album. |
| Lyrics | The lyrics for the content of the track. |
| LengthInMilliseconds | The length of the track (in milliseconds). |
| LastPlayed | The last time the track was played on the computer. |
| Album | The name of the album the track is on. |
| Artist | The artist of the track. |
| Genre | The genre or category of the track. |
| OriginalIndex | The original position of the track on the album it came from. |
| RipFilename | The name of a file ripped from the track. |
| Enabled | Whether the track is marked as "playable" on the album. Non-enabled tracks appear "grayed out" in the user interface and are skipped over rather than played when the album is played. |
| TOC | The disc identifier (based on the table of contents information) of the original CD the track was on. |
| PlayCount | The number of times the track has been played on the computer. |
| LastEditedBy | An identification of the last entity (either the name of the meta data provider or "user") to edit any property associated with the object. |
| Provider | The name of the original meta data provider. |
| Composer | The composer of the album. |
| CoverArtSmall | A small graphic of the album's cover art. |
| CoverArtLarge | A larger graphic of the album's cover art. |
| AlbumPlaylist Object | |
| Name | The name of the album play list. |
| Copyright | Copyright information for the album. |
| Label | The recording company label that produces the album. |
| ReleaseDate | The date of release of the album. |
| Rating | A rating for the album. |
| Style | The style of the content in the play list. |
| CDID | A hashed value of the disc identifier, allowing for faster lookups. |
| TOC | The disc identifier (based on the table of contents information) for the album. |
| LastPlayed | The last time a track in the play list was played on the computer. |
| Artist | The artist of the album. |
| Genre | The genre or category of the album. |
| Parent | The parent of the object. |
| LastPlaylistEntryID | The ID of the last entry in the play list. |
| LastEditedBy | The user that last edited the play list. |
| Composer | The composer of the album. |
| TotalDuration | The total play time of the content on the play list. |
| BuyNow | Information on how to purchase the album. |
| MoreInfo | A URL to a web page with more information about the object. |
| PlaylistProperties Object | |
| Name | The name of the play list. |
| NumMediaChildren | The total number of children of the object that are media content |
| NumAudioMediaChildren | The total number of children of the object that are audio media content. |
| NumVideoMediaChildren | The total number of children of the object that are video media content. |
| LastPlaylistEntryID | The ID of the last entry in the play list. |
| Attributes | A set of one or more flags that specify different play list attributes, such as a "deleted" indicating the play list is marked for deletion. |
| CreationTime | The time the play list was created. |
| LastModifiedTime | The last time the play list was modified. |
| TotalDuration | The total playtime of content on the play list. |
| Author | The author of the play list. |
| Genre | The genre or category of content on the play list. |
| Copyright | Copyright information for the content on the play list. |
| PlaylistFromAlbum Object | |
| Name | The name of the play list. |

-continued

| Object Types | |
|---|---|
| | Description |
| Track Object | |
| Filename | The filename of the track on the hard drive. |
| Title | The title of the track. |
| Subtitle | Subtitle information for the track. |
| Copyright | Copyright information for the track. |
| FileType | Type of file (e.g., MP3 or WMA). |
| Time | The time the file was created. |
| Date | The date the file was created. |
| Language | The language the content of the track is in. |
| MediaType | The type of media the track is on. |
| PartInSet | Indicates which part of a set the track is on (e.g., which disc of a multiple-disc set). |
| EncodedBy | Name of the person who ripped the track. |
| Publisher | The publisher of the media the track is on. |
| TrackNumber | The number of the track on the media. |
| RecordingDates | The recording date(s) of the track. |
| NetRadioStation | The name of an Internet-accessible radio station where the track is received from. |
| NetRadioOwner | The owner of an Internet-accessible radio station where the track is received from. |
| Year | Year of original recording of the track. |
| BeatsPerMinute | The number of beats per minute in the content of the track. |
| MusicalKey | The musical key the content of the track is in. |
| LengthInMilliseconds | The length of the track (in milliseconds). |
| Album | The album the track is on. |
| OriginalAlbum | Name of album the track first appeared on. |
| OriginalFilename | First filename of the track (same as the Filename if it has not been renamed since created). |
| OriginalReleaseYear | The year the track was original released in. |
| FileOwner | Name of person with rights to this file. |
| Size | The size (e.g., in frames) of the track on the media. |
| ISRC | The International Standard Recording Code. |
| Software | Name of the software that ripped the track. |
| Rating | A rating for the track. |
| Comment | Comments regarding the track. |
| CDID | A hashed value of the disc identifier, allowing for faster lookups. |
| TOC | The disc identifier (based on the table of contents information) for the media storing the track. |
| Genre | The genre or category of the track. |
| Ripped | Whether the track has been ripped to a file. |
| OriginalIndex | The position on the album that the track appeared on. |
| LastEditedBy | An identification of the last entity (either the name of the meta data provider or "user") to edit any property associated with the object. |
| MediaTypeId | An identifier of the media type the track is on. |
| Attributes | A set of one or more flags that specify different play list attributes, such as a "deleted" indicating the play list is marked for deletion. |
| PlayCount | The number of times the track has been played. |
| Bitrate | The encoding rate of the file. |
| Protected | Flag indicating whether digital rights management (DRM) is used on the file. |
| CreationTime | The time the file was first added to the database. |
| LastModifiedTime | The last time any attribute of the track was changed in the database. |
| Composer | The composer of the track. |
| CoverArtSmall | A small graphic of the cover art of the media including the track. |
| CoverArtLarge | A larger graphic of the cover art of the media including the track. |
| TrackedFilename | An identifier of the file in the file system of the operating system using the database, allowing the file to be searched if it is not accessible by filename. |
| Lyrics | The lyrics for the content of the track. |
| Batch Object | |
| CDID | A hashed value of a disc identifier, allowing for faster lookups. |
| NumTracks | A number of tracks on the disc. |
| TOC | A disc identifier. |
| Link Object | |
| Name | Friendly display name of a link. |
| URL | URL of the linked content. |
| Picture Object | |
| Caption | A text description for a picture. |
| URL | A uniform resource locator of where the picture is located. |
| TrackedLink | An identifier of the picture in the file system of the operating system using the database, allowing the file to be searched if it is not accessible by filename. |
| Thumbnail | A thumbnail image for the picture. |
| CustomData Object | |
| Name | The name of the object. |
| NumericValue | A numerical value for the object. |
| TextValue | A text value for the object. |
| DateValue | A date value for the object. |
| BinaryValue | A binary value for the object. |
| UnicodeTextValue | A unicode text value for the object. |
| ChildListEntry Object | |
| ObjectType | GUID of the object type for the object. |
| ObjectInstanceID | Actual ID of the object. |
| ListPosition | Position of the media object in the play list. |
| ListInstanceID | Instance ID of the media object in the play list object. |
| DVD Object | |
| Title | The title of the DVD. |
| Genre | The genre or category of the content on the DVD. |
| Director | The director of the content on the DVD. |
| ReleasedBy | The entity that released the DVD. |
| ProducedBy | The producer of the content on the DVD. |
| Studio | The studio that owns the content on the DVD. |
| Duration | The total playback time of the content on the DVD (or a portion of the content, such as a movie). |
| Rating | The rating of the content on the DVD. |
| RatingOrg | The organization that gave the rating for the content. |
| Copyright | Copyright information for the content on the DVD. |
| Comment | Comments regarding the DVD. |
| ReleaseDate | The release date of the DVD. |
| URL | Locator (URL) of the DVD for rendering. |
| ID | DVD identifier generated from a CRC 64 of portions of the DVD content. |
| LeadPerformers | The names of the lead performers in the content on the DVD. |
| BuyNow | Information on how to purchase the DVD. |
| MoreInfo | A URL to a web page with more information about the DVD. |
| CoverArtSmall | A small graphic of the cover art of the DVD. |
| CoverArtLarge | A larger graphic of the cover art of the DVD. |
| MPAA Rating | A rating assigned by the Motion Picture Association of America (MPAA) to the content of the DVD. |

| Object Types | |
|---|---|
| | Description |
| DVDTitle Object | |
| Name | The name of the title (the primary content) of a DVD. |
| Genre | The genre or category of the title. |
| Director | The director of the title. |
| ReleasedBy | The entity that released the title. |
| ProducedBy | The producer of the title. |
| Studio | The studio that owns the title. |
| Duration | The total playback time of the title. |
| Rating | The rating of the title. |
| RatingOrg | The organization that gave the title the rating. |
| Copyright | Copyright information for the title. |
| Comment | Comments regarding the title. |
| ReleaseDate | The release date of the title. |
| LeadPerformers | The names of the lead performers in the title. |
| MPAARating | A rating assigned by the Motion Picture Association of America (MPAA) to the title. |
| ID | DVD identifier generated from a CRC 64 of portions of the DVD content. |
| DVDChapter Object | |
| Name | The name of a chapter on a DVD. |
| Genre | The genre or category of the chapter. |
| Director | The director of the chapter. |
| ReleasedBy | The entity that released the chapter. |
| ProducedBy | The producer of the chapter. |
| Studio | The studio that owns the chapter. |
| Duration | The total playback time of the chapter. |
| Rating | The rating of the chapter. |
| RatingOrg | The organization that gave the chapter the rating. |
| Copyright | Copyright information for the chapter. |
| Comment | Comments regarding the chapter. |
| ReleaseDate | The release date of the chapter. |
| LeadPerformers | The names of the lead performers in the chapter. |
| MPAA Rating | A rating assigned by the Motion Picture Association of America (MPAA) to the chapter. |
| ID | DVD identifier generated from a CRC 64 of portions of the DVD content. |
| Factoid Object | |
| Fact | The content (e.g., fact or comment) of the factoid. |

Figure 5:
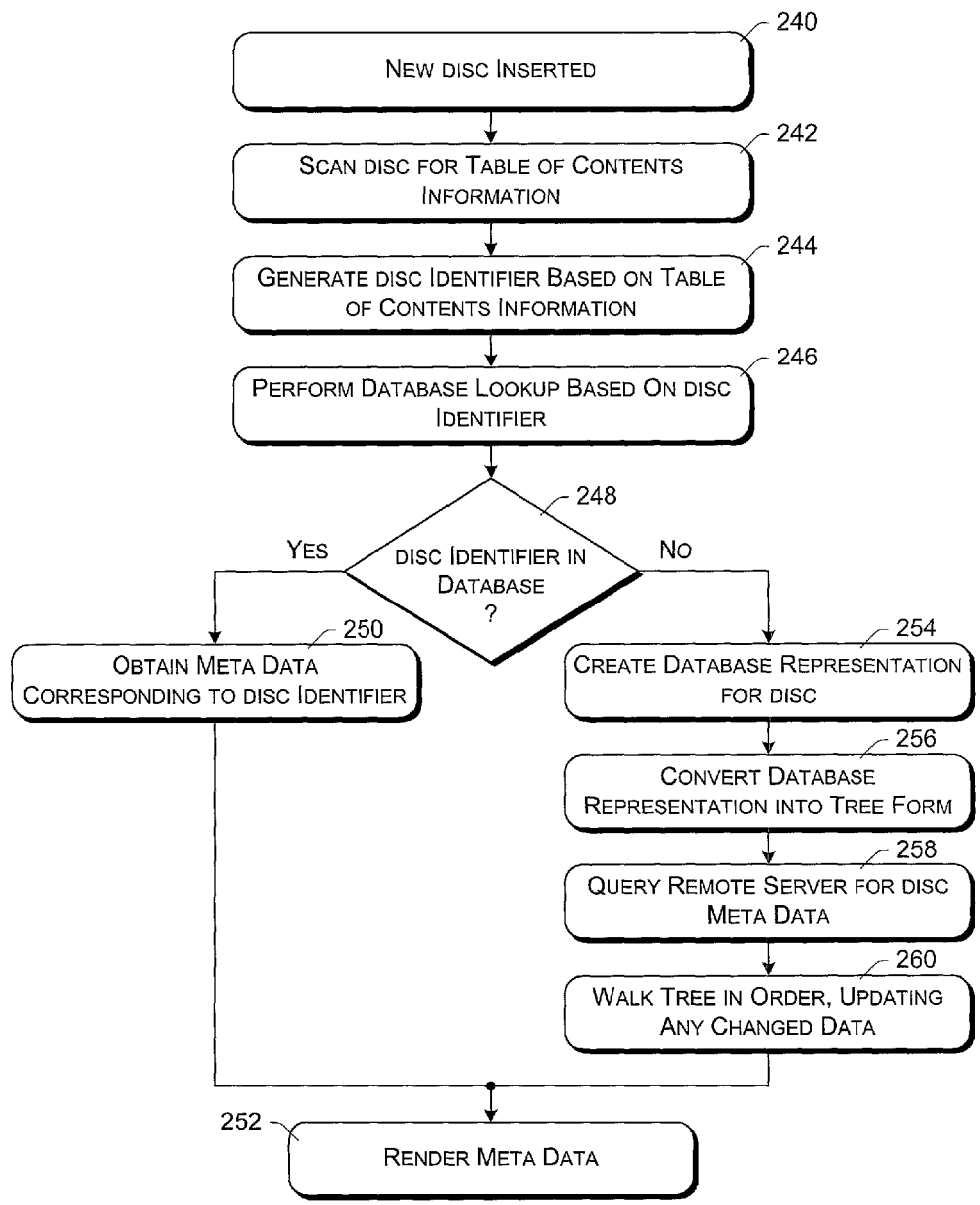
FIG. 5 is a flowchart illustrating an exemplary process for rendering media content meta data.

FIG. 5 is a flowchart illustrating an exemplary process for rendering media content meta data. The process of FIG. 5 is carried out by meta data manager 124 of FIG. 1, and may be implemented in software. The process of FIG. 5 is discussed with reference to a CD, although other types of media may alternatively be used.

Initially, a disc is inserted to the computer (act 240). The disc is then scanned for its table of contents information (act 242) and a disc identifier is generated based on the table of contents information (act 244).

A database lookup is then performed based on the disc identifier (act 246), to determine whether the disc identifier exists in the database. In the example of FIG. 3, this can be accomplished by checking the value for each entry in properties table 206 that has a property ID for a disc identifier. If any of the values are the same as the generated disc identifier, then the disc identifier already exists in the database; otherwise, the disc identifier does not already exist in the database. The result of this lookup is then used to determine the appropriate course of action (act 248).

If the disc identifier is in the database, then the meta data corresponding to the disc identifier is obtained from the database (act 250) and rendered, or otherwise made available, to the user (act 252). Returning to act 248, if the disc identifier is not in the database, then a database representation is created for the disc (act 254). This database representation includes the data that will be placed in the tree structure (e.g., the disc identifier and an indication of each track on the disc). The database representation is then converted into tree form (act 256), with the disc identifier as the root node and a child node for each track on the disc. The unknown meta data for each node object is initially identified as "unknown" (some meta data, such as disc identifier, is known and can be stored in the database). A remote server is then queried for the disc meta data (act 258). In the illustrated example, this querying is performed by communicating the disc identifier to a remote server(s), which in turn accesses the meta data it stores for any meta data corresponding to the disc identifier, and returns that meta data to the requesting computer. Processing then continues with walking the tree in order, updating any changed meta data (act 260) to replace the values of "unknown" with the values received from the server, and rendering the meta data (act 252).

It should be noted that the remote server may not always be accessible. For example, the client 102 of FIG. 1 may not always be coupled to network 108 (e.g., the Internet), and thus not be able to access servers 104 and 106. In these situations, meta data manager 124 keeps the values of "unknown" for the unknown meta data and then accesses server 104 or 106 when the client is coupled to network 108. At this point, the meta data is obtained from servers 104 and/or 106, and the local meta data store updated appropriately. In one implementation, meta data manager 124 maintains a separate record (e.g., in a separate file) of disc identifiers for CDs that were added to the database when servers 104 and 106 were not accessible to client 102. Thus, meta data manager 124 can readily ascertain which meta data it needs from servers 104 and 106. Alternatively, no such separate record may be maintained, and the database may be searched to identify "unknown" values and determine, based on the tree structure, which disc identifiers correspond to the needed meta data.

Figure 6:
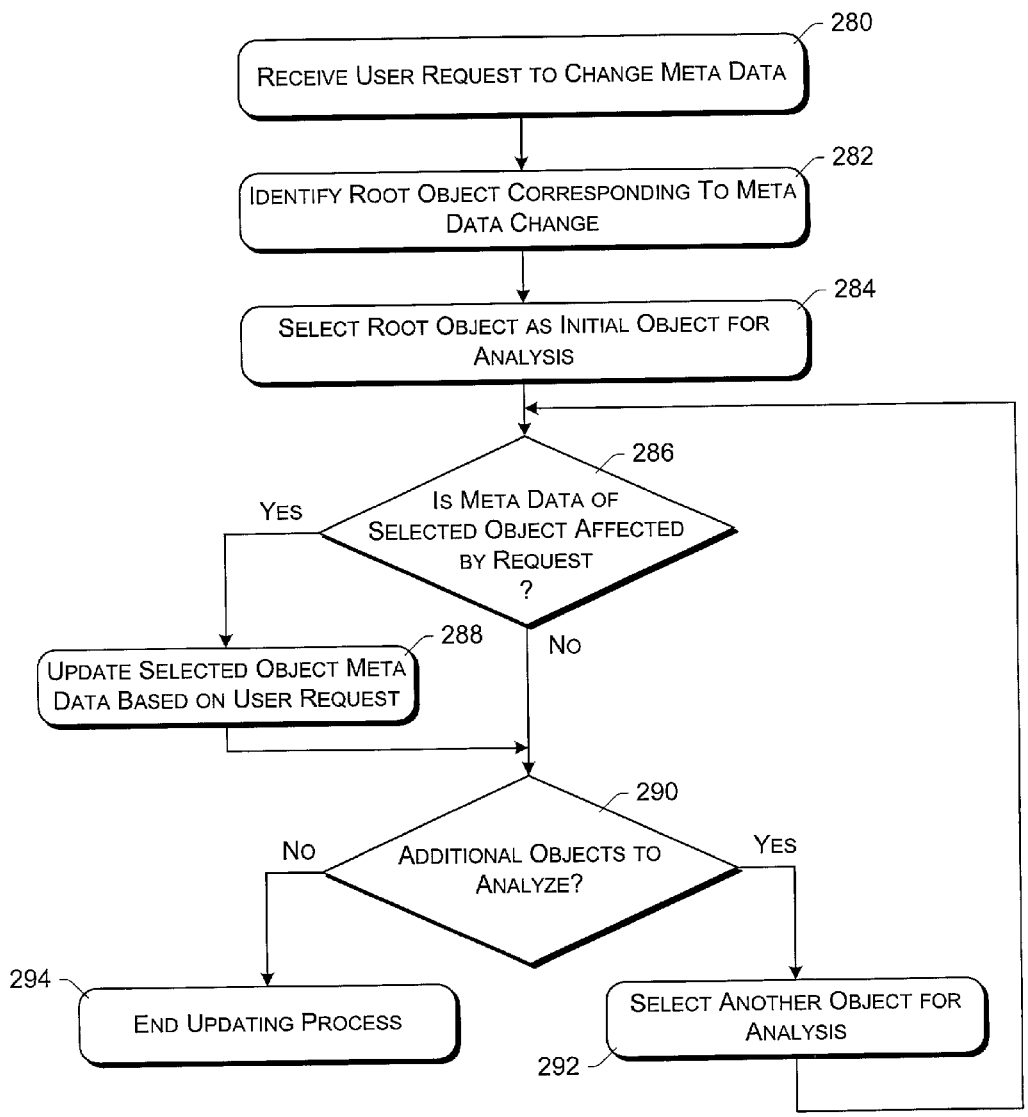
FIG. 6 is a flowchart illustrating an exemplary process for updating media content meta data.

FIG. 6 is a flowchart illustrating an exemplary process for updating media content meta data. The process of FIG. 6 is carried out by meta data manager 124 of FIG. 1, and may be implemented in software.

Initially, a user request to change the meta data is received (act 280), which includes an indication of the change the user would like to make (for example, what new data the user would like to add). The root object corresponding to the meta data change is then identified (act 282), and selected as the initial object for analysis (act 284). A determination is then made as to whether the selected object is affected by the request (act 286). An object is affect by the request if the object has meta data associated with it that corresponds to the user's request. For example, the root disc object may have be affected if the user requests to change the artist name of a CD, but not if the user requests to change the title of a track on the CD.

If the selected object is affected by the request, then the meta data associated with the selected object is updated based on the request (act 288). In one implementation, this updating comprises overwriting previous meta data with the meta data received as part of the user request. A check is then made as to whether any additional objects are to be analyzed (act 290). In one implementation, file manager 124 analyzes every object in the tree to determine whether it is affected by the request. If there are one or more additional objects to analyze, then one of the additional objects is selected (act 292) and the process returns to act 286. However, if there are no more objects to analyze, then the updating process ends (act 294).

The following example illustrates the process of updating media content data of FIG. 6. Assume that a user changes the title for a song (track) on a CD that is represented by track object 154 of FIG. 2. Meta data manager 124 begins with disc object 150 and does not change any meta data associated with disc object 150. However, track object 154 is affected by the user's requested change, so the title meta data associated with track object 154 is changed to identify the new title. Similarly, each of local file objects 160 and 162 are affected by the user's requested change, so the title meta data associated with each of file objects 160 and 162 are changed to identify the new title.

Figure 7:
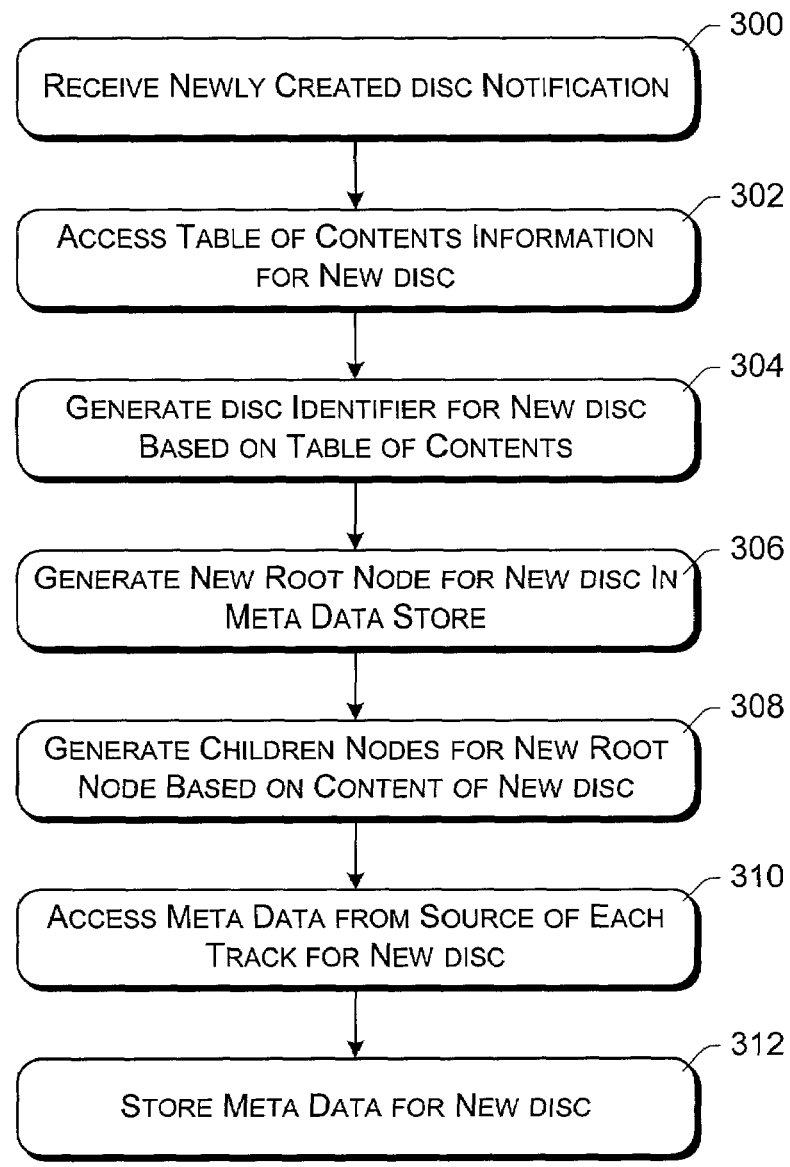
FIG. 7 is a flowchart illustrating an exemplary process for generating meta data for new media.

FIG. 7 is a flowchart illustrating an exemplary process for generating meta data for new media. The process of FIG. 7 is carried out by meta data manager 124 of FIG. 1, and may be implemented in software. The process of FIG. 7 is discussed with reference to a CD, although other types of media may alternatively be used.

Many commonly-available computer systems allow a user to generate his or her own media having whatever content he or she desires. For example, a device commonly referred to as a CDROM burner allows a user to create his or her own CDs with audio tracks of his or her choosing. This created CD can then be played in virtually any conventional CD drive. However, because the CD is a user-created CD, even though it may be created based on tracks from other publicly available CDs, its table of contents and thus its disc identifier will be different, and remote servers will not have meta data for the CD.

Meta data manager 124 solves this problem by communicating with the module that is managing the creation of the new CD (e.g., content player 122). The module managing creation of the new CD knows the identity of the tracks being stored on the new CD. Meta data manager 124 uses this track identification information to access the local meta data store and create new meta data. This process is illustrated in FIG. 7.

Initially, a notification of a newly created disc is received (act 300). The module managing creation of the new disc notifies meta data manager 124 that the new disc is being created. Once the new disc is created, meta data manager 124 accesses the table of contents information for the new disc (act 302). A disc identifier is then generated based on the table of contents information (act 304), analogous to act 244 of FIG. 5.

A new root node is then created for the new disc in the local meta data store (act 306). New children nodes are also created (act 308) based on the contents of the disc. For each child (track) node, the manager 124 accesses the meta data for the track stored in the database form the source of that track (act 310). In this situation, the source of the track refers to the track (or file) that the user identifies as being a track that should be stored on the new CD. This meta data is then stored for the new disc (act 312).

It should be noted that, when creating a new CD, the tracks stored on the new CD may optionally be associated with the source. In one implementation, this is accomplished by identifying each track on the new CD as a child of the original file or track. For example, if a user creates a new CD by copying a track from a previous CD X, then a new CD root node and track node for the new track are created as discussed above. Furthermore, the track for the new CD is identified in the database as a child of the track on CD X, so any subsequent changes to the meta data for that track on CD X are propagated to the meta data for the new track.

Figure 8:
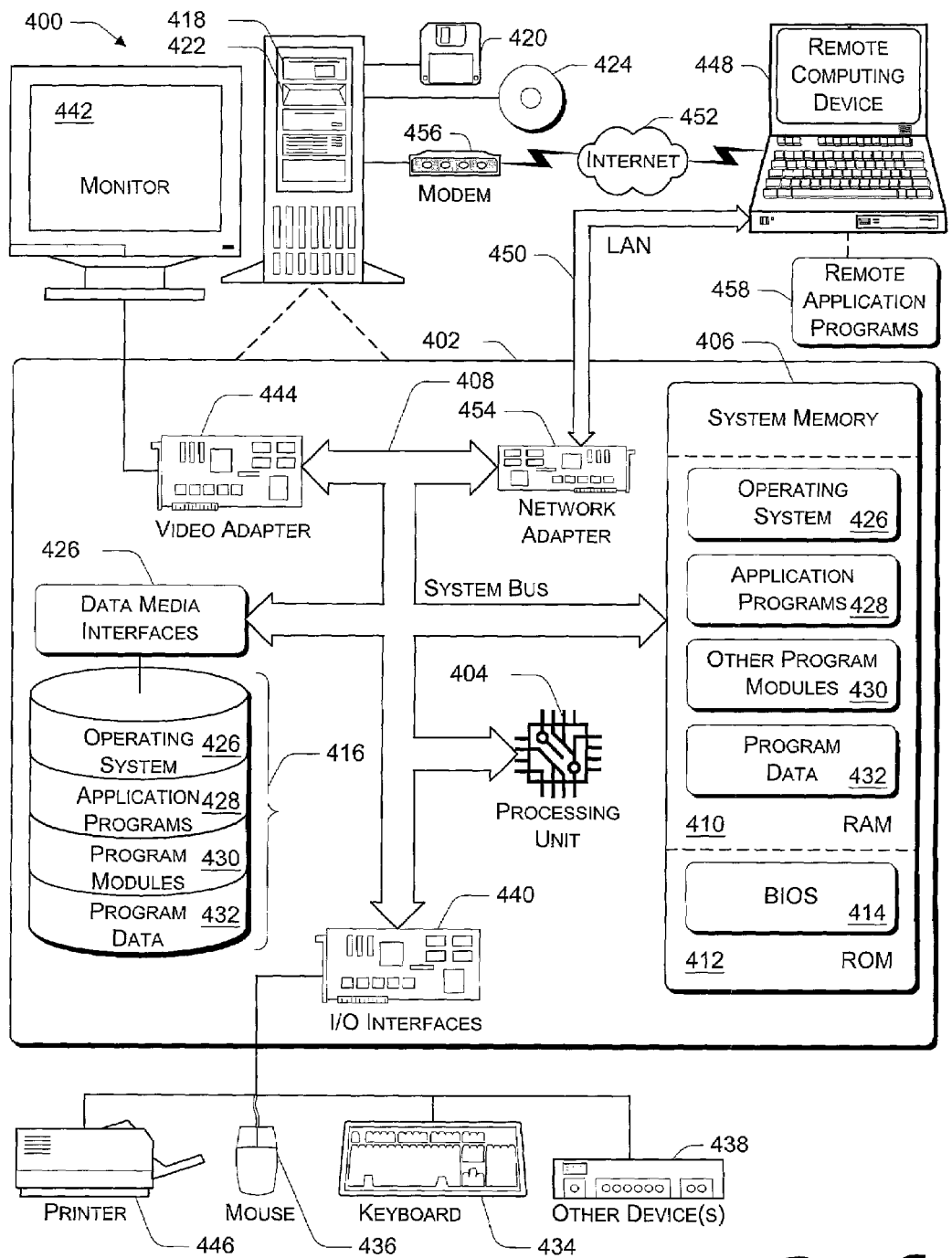
FIG. 8 illustrates a general exemplary computer environment which can be used to implement the improved meta data management.

FIG. 8 illustrates a more general exemplary computer environment 400, which can be used to implement the improved meta data management described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, any of computing devices 102, 104, or 106 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 8 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disc drive 422 for reading from and/or writing to a removable, non-volatile optical disc 424 such as a CD-ROM, DVD-ROM, or other optical media. The hard disk drive 416, magnetic disk drive 418, and optical disc drive 422 are each connected to the system bus 408 by one or more data media interfaces (not shown).

The various drives and their associated computer-readable media provide non-volatile storage of computer readable instructions, data structures, program modules, and other data for computer 402. Although the example illustrates a hard disk 416, a removable magnetic disk 420, and a removable optical disc 424, it is to be appreciated that other types of computer readable media which can store data that is accessible by a computer, such as magnetic cassettes or other magnetic storage devices, flash memory cards, CD- ROM, digital versatile discs (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disc 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other media which can be used to store the desired information and which can be accessed by computer 402. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

APPENDIX

All methods return HRESULTs unless otherwise stated.

IMediaIndexManager

**OpenScheme(LPCWSTR wszName, void* pReserved, LPMEDIAINDEXSCHEME* ppScheme)**
   Opens a specific scheme that has already been registered under the name *wszName*. A scheme object is returned in the *ppScheme* parameter. A parameter *pReserved* is reserved for future use.
   The usual flow would be to try to open a named scheme, and if this method returns a failure code, register the scheme and try again.

**RegisterSchemeFromXMLObject(LPCWSTR wszName, IXMLDOMDocument* pXMLDoc)**
   Takes an XML document object identified by *pXMLDoc* and stores it in the registry under the specified name *wszName*. Schemes are stored in:
   HKEY_LOCAL_MACHINE\SOFTWARE\Microsoft\Windows\CurrentVersion\MediaContentIndex\Schemes

RegisterSchemeFromXMLScript(LPCWSTR wszName, LPCWSTR wszXMLScript)
   Takes an XML document in string form identified by *wszXMLScript* and stores it in the registry under the specified name *wszName*, after validating that it is a createable XML document. Schemes are stored in:
   HKEY_LOCAL_MACHINE\SOFTWARE\Microsoft\Windows\CurrentVersion\MediaContentIndex\Schemes
   Basically, this method just CoCreates a new XML document object and calls RegisterSchemeFromXMLObject if the XML document is valid.

RegisterSchemeFromXMLFile(LPCWSTR wszName, LPCWSTR wszSchemeFilePath)
   Takes an XML document in string form (stored in the specified file *wszSchemeFilePath*) and stores it in the registry under te specified name *wszName*, after validating that it is a createable XML document. Schemes are stored in:
   HKEY_LOCAL_MACHINE\SOFTWARE\Microsoft\Windows\CurrentVersion\MediaContentIndex\Schemes
   Basically, this method just CoCreates a new XML document object and calls RegisterSchemeFromXMLObject if the XML document is valid.

BeginSchemeEnumeration(void)
   Tells the index that we want to begin getting a list of schemes that are registered.
   Returns: E_MM_NOSCHEMES if no schemes are found in the registry.

EnumerateScheme(LPWSTR wszName, DWORD cchName)
Gets the next registered scheme's name after *wszName*. The name parameter *cchName* is filled in up to the count of characters provided (note that this is a count of UNICODE characters available, not the number of bytes in the string).
Returns: E_MM_NOENUMERATION if BeginSchemeEnumeration() has not been called successfully.

EndSchemeEnumeration(void)
Tells the index that we're done enumerating scheme names. Can be called safely even if BeginSchemeEnumeration() has not been called.

IMediaIndexScheme

**GetSchemeInfo (LPWSTR wszSchemeName, IXMLDOMDocument\*\* ppXMLDoc)**
Returns the name of the current scheme in *wszSchemeName* and its XML document object in *ppXMLDoc*. This object must be released by the caller.

OpenIndex (void)
Opens the Media Index. Must be called in order to get a root. If the Media Index is already open, calling this routine again is an error. Opening the index is a time-consuming operation and therefore opening and closing the index multiple times should be avoided.

Returns:  E_MM_DBALREADYOPEN if OpenIndex has already been called.
E_MM_BADSCHEME if we can't extract a file name from the XML scheme.

CloseIndex (void)
Closes the Media Index. Must be called when exiting the client application, otherwise there will be leaks and the database may be left in an inconsistent state.
Returns: E_MM_DBNOTOPEN if OpenIndex() has not been called successfully.

BeginUserEnumeration (void)
Tells the index that we want a list of users.
Returns: E_MM_DBNOTOPEN if OpenIndex() has not been called successfully.

EnumerateUser (LPWSTR wszUserName)

Returns the name of a user in *wszUserName*, and moves an internal pointer to the next one.

Returns:  E_MM_NOENUMERATION if BeginUserEnumeration has not been called successfully.

E_MM_EOL if there are no more users to enumerate.

EndUserEnumeration (void)

Tells the index that we're done getting our list of users. Can be called safely even if BeginUserEnumeration() has not been called.

SetCurrentUser (LPCWSTR wszUserName)

Sets a user name as the name identified in *wszUserName*. Note that this is not necessary if you wish to have the current logged-on user as the current user of the index, since this is the default behavior.

Returns:  E_MM_DBNOTOPEN if OpenIndex() has not been called successfully.

BeginTransaction (void)

Begins a transaction in the index. A transaction is a logical set of operations in the database that can be applied as one set and canceled if there are any failures. For example, if you wish to enter an album and all of its properties, but don't want any of the information saved if there is a failure during the process, you would begin a transaction before doing anything else.

Returns:  E_MM_DBNOTOPEN if OpenIndex() has not been called successfully.

EndTransaction (BOOL fCommit)

Ends the current transaction and commits the data to the database, if *fCommit* is returned as true. Otherwise, it throws away all database operations since "BeginTransacation" was called and returns *fCommit* as false.

Returns:  E_MM_DBNOTOPEN if OpenIndex() has not been called successfully.

GetRoot (LPMEDIAINDEXROOT* ppObject)

Returns the index root in *ppObject*.

Returns:  E_MM_DBNOTOPEN if OpenIndex() has not been called successfully.

GetIndexFilename (LPWSTR wszFilename)

Returns the filename of the index associated with this scheme in *wszFilename*.

Returns:  E_INVALIDARG if wszFilename is NULL.

BeginObjectTypeEnumeration (LPDWORD pdwCount)

Starts enumerating object types from the current scheme. Unlike actually enumerating objects, this can be done even when there are no instances of the object in the data base. Caller can ask for an optional count of objects through the *pdwCount* parameter.

Returns: E_MM_ENUMERATIONACTIVE if you're already enumerating object types for this scheme.

EnumerateObjectType (REFGUID guidObjectID, LPWSTR wszObjectName)

Returns the next object type in the enumeration. Both parameters get values returned: the *guidObjectID* is the GUID of the object type, and the *wszObjectName* is the name of the object type from the scheme.

Returns: E_MM_NOENUMERATION if you haven't called BeginObjectTypeEnumeration successfully.
E_MM_EOL if there are no more object types.

EndObjectTypeEnumeration (void)

Required call to end an object type enumeration. May be safely called even though BeginObjectTypeEnumeration() was not.

BeginPropertySetTypeEnumeration (LPCGUID pguidObjectID, LPDWORD pdwCount)

Starts enumerating property set types from the current scheme. Unlike actually enumerating property sets, this can be done even when there are no instances of the property set in the data base. If the optional *pguidObjectID* parameter is specified, this will only enumerate property sets for that object; otherwise, this enumerates all property sets in scheme. Caller can ask for an optional count of property sets through the *pdwCount* parameter.

Returns: E_MM_ENUMERATIONACTIVE if you're already enumerating property set types for this scheme.
E_OUTOFMEMORY if internal allocation failure.

EnumeratePropertySetType (REFGUID guidObjectID, REFGUID guidPropertySetID, LPDWORD pdwPropertySetID, LPWSTR wszPropertySetName)

Returns the next property set type in the enumeration. All four parameters get values returned (if they're specified): *guidObjectID* is the GUID of the object type to which the property set belongs, *guidPropertySetID* is the GUID of the property set type itself, *pdwPropertySetID* is the ordinal of the property set in the data base, and *wszPropertySetName* is the name of the property set type from the scheme.

Returns:  E_MM_NOENUMERATION if you haven't called
                  BeginPropertySetTypeEnumeration successfully.
            E_MM_EOL if there are no more property set types.

EndPropertySetTypeEnumeration (void)

Required call to end a property set type enumeration. May be safely called even though BeginPropertySetTypeEnumeration() was not.

BeginPropertyTypeEnumeration (LPCGUID pguidPropertySetID, LPDWORD pdwCount)

Starts enumerating property types from the current scheme. Unlike actually enumerating properties, this can be done even when there are no instances of the property in the data base. If the optional *pguidPropertySetID* parameter is specified, this will only enumerate properties for that property set; otherwise, this enumerates all properties in the scheme. Caller can ask for an optional count of properties through the *pdwCount* parameter.

Returns:  E_MM_ENUMERATIONACTIVE if you're already enumerating
                  property types for this scheme.
            E_OUTOFMEMORY if internal allocation failure.

EnumeratePropertyType (REFGUID guidPropertySetID, LPDWORD pdwPropertyID, LPWSTR wszPropertyName, LPDWORD pdwDataType)

Returns the next property type in the enumeration. All four parameters get values returned (if they're specified): *guidPropertySetID* is the GUID of the property set type to which the property belongs, *pdwPropertyID* is the ordinal of the property type in the data base, *wszPropertyName* is the name of the property type from the scheme, and *pdwDataType* is the data type of the property value.

Returns:  E_MM_NOENUMERATION if you haven't called
                  BeginPropertyTypeEnumeration successfully.
            E_MM_EOL if there are no more property types.

EndPropertyTypeEnumeration (void)

Required call to end a property type enumeration. May be safely called even though BeginPropertyTypeEnumeration() was not.

WriteSchemeToXMLFile (LPCWSTR wszSchemeFile)
Exports the XML data for the scheme as a string to the file path specified as *wszSchemeFile*.
Returns: E_MM_REGNOKEY or E_MM_REGNOVALUE if scheme wasn't found in registry.
E_MM_CANTCREATEFILE or E_MM_CANTWRITEFILE if there were problems exporting to the specified file path.

IMediaIndexRoot

BeginObjectEnumeration (LPCGUID pguidObjectType, DWORD dwStartingIndex, BOOL fRestrictToCurrentUser, LPDWORD pdwCount)
Tells the index that we want to start getting a list of objects. The parameters are:
*pguidObjectType:* NULL or a pointer to a GUID. NULL means "all objects" and a valid GUID means "just objects of this type" (for example, just Albums).
*dwStartingIndex:* Start at this index, 0 is the beginning.
*fRestrictToCurrentUser:* Reserved for future use.
*pdwCount:* If this is non-NULL, returns the count of objects that will be enumerated. This can be an expensive operation, so unless you really need the count before enumerating, don't use this parameter.

EnumerateObjects (LPMEDIAINDEXOBJECT *ppObject)
Returns as *ppObject* the next object in the enumeration. Will return a failed hresult when there is no more data.
Returns: E_MM_NOENUMERATION if BeginObjectEnumeration() has not been called successfully.
E_MM_EOL if there are no more objects to enumerate.

EndObjectEnumeration (void)
Tells the index that we're done with the current enumeration. Can be called safely even if BeginObjectEnumeration() has not been called.

Search (LPCGUID pguidObjectTypeList, DWORD dwObjTypes, LPCGUID pguidPropertySetTypeList, WORD dwPropertySetTypes, LPDWORD pdwPropertyNumberList, DWORD dwProperties, LPCWSTR wszSearch, DWORD dwFlags, LPMEDIAINDEXSEARCHSINK pResultSink)

Searches for properties that match all specified object types, property set types and property ID's, then compares the value of each qualifying property against the specified search string. Returns any matches and final status to the object specified in *pResultSink*. Search is done on a separate thread, and matches are returned asynchronously, as they are found. It is the client's responsibility to order the list of matches in a logical way.

Returns: E_MM_SEARCHINPROGRESS if there is an active search on this root.
The parameters are:

*pguidObjectTypeList:* pointer to array of object type GUID's to match.
*dwObjTypes:* count of entries in *pguidObjectTypeList*.
*pguidPropertySetTypeList:* pointer to array of property set type GUID's to match.
*dwPropertySetTypes:* count of entries in *pguidPropertySetTypeList*.
*pdwPropertyNumberList* : pointer to array of property ID's to match.
*dwProperties:* count of entries in *pdwPropertyNumberList*.
*wszSearch:* string to match against property value of qualifying properties.
*dwFlags:* flags governing the way the search and string matching is performed.
*pResultSink:* pointer to object that will receive the search results, as they are found.

CancelSearch()

Can be called to cancel an active search.
Returns: E_MM_UNINIT if Search() has not been called successfully.

CreateObject (REFGUID guidObjectType, LPMEDIAINDEXOBJECT* ppObject)

Creates a new object of the type specified in *guidObjectType*, and returns the new object in *ppObject*.
Returns: E_MM_NOSUCHOBJ if guidObjectType not found.

FetchObject (REFGUID guidObjectType, DWORD dwInstanceID, LPMEDIAINDEXOBJECT* ppObject)

Fetches the specific object of the type *guidObjectType* and instance ID *dwInstanceID* specified, returning the object as *ppObject*.
Returns:  E_MM_NOSUCHOBJ if guidObjectType not found.
   E_MM_EOL if dwInstanceID not found.

FetchObjectByNumericProperty (REFGUID guidObjectType, REFGUID guidPropertySetID, DWORD dwPropertyID, DWORD dwValue, LPMEDIAINDEXOBJECT* ppObject)

Fetches a specific object of the type *guidObjectType* and property set *guidPropertySetID* based on the numeric value *dwValue* of a specific property *dwPropertyID*, returning the object as *ppObject*. This is valuable if you know that the numeric property is a "key" of the object (for example, the Album Hash ID for a CD).

Returns:  E_MM_NOSUCHOBJ if guidObjectType not found.
                E_MM_NOSUCHPROPSET if guidPropertySetID not found.
                E_MM_NOSUCHPROP if dwPropertyID not found.

FetchObjectByTextProperty (REFGUID guidObjectType, REFGUID guidPropertySetID, DWORD dwPropertyID, LPCWSTR wszSearch, LPMEDIAINDEXOBJECT* ppObject)

Fetches a specific object of the type *guidObjectType* and property set *guidPropertySetID* based on its text property *dwPropertyID* having the value *wszSearch*. This is valuable if you know that the text property is a "key" of the object (for example, the name property of an artist).

Returns:  E_MM_NOSUCHOBJ if guidObjectType not found.
                E_MM_NOSUCHPROPSET if guidPropertySetID not found.
                E_MM_NOSUCHPROP if dwPropertyID not found.

RemoveObject (LPMEDIAINDEXOBJECT pObject)

Removes an object identified by *pObject* from the index. This clears all of its properties and relationships.

Returns:     E_MM_NOSUCHOBJ if object not found in object values table.

SetSearchExclusions (LPCWSTR wszExclude)

Optionally allows specification of a list of words *wszExclude* that will be ignored from the user's input, only when matching on individual words (i.e. no words are excluded when matching on phrases). Generally includes things like "the", "a", and "and". Format of the wszExclude string is that each word is terminated with a NULL, and the entire string is terminated with an extra NULL (so the string must end in 2 NULL's).

Added to allow localization support for excluded words.

SetSearchSeparators (LPCWSTR wszSep)

Optionally allows specification of the list of characters *wszSep* that are deemed to mark the start/end of a word. When parsing the *wszSearch* string of the Search() method, and any strings in the data base, these separators allow the Media Index to determine where words start and end, so that individual words in a phrase may be compared.

If no separator list is supplied by the client, the separator list defaults to a single space band.

Added to allow localization support for separator characters.

IMediaIndexObject

GetObjectInfo (REFGUID guidObjectType, LPWSTR wszObjectTypeName, LPWSTR wszObjectDisplayName, LPDWORD pdwInstanceID)

Returns the GUID (*guidObjectType* is an OUT parameter) and instance ID (*pdwInstanceID*) of this object.

Optional name parameters return the object name *wszObjectTypeName* from the scheme, and the "display name" *wszObjectDisplayName* property of the object (if any).

BeginConnectionEnumeration (BOOL fChildren, DWORD dwStartingIndex, LPCGUID pguidObjectType, BOOL fRestrictToCurrentUser, LPDWORD pdwCount)

Tells the index that we want to start getting a list of objects. The parameters are:

*fChildren:* TRUE to enumerate children, FALSE to enumerate parents.

*pguidObjectType:* NULL or a pointer to a GUID. NULL means "all objects" and a valid GUID means "just objects of this type" (for example, just Albums).

*dwStartingIndex:* Start at this index, 0 is the beginning.

*fRestrictToCurrentUser:* Reserved for future use.

*pdwCount:* If this is non-NULL, returns the count of objects that will be enumerated. This can be an expensive operation, so unless you really need the count before enumerating, don't use this parameter.

EnumerateConnection (LPMEDIAINDEXOBJECT *ppObject)

Returns the next object in the enumeration as *ppObject*. Will return a failed hresult when there is no more data.

Returns: E_MM_NOENUMERATION if BeginConnectionEnumeration() has not been called successfully.

E_MM_EOL if no more connections to enumerate.

EndConnectionEnumeration (void)

Ends the connection enumeration. Can be called safely even if BeginConnectionEnumeration() has not been called.

AddChild (LPMEDIAINDEXOBJECT pAddObject, LPMEDIAINDEXOBJECT pNextObject)

Adds a child to this object. *pAddObject* is the new child, *pNextObject* is the object that will come next in the list of children, or NULL to put the new child at the end of the list.

RemoveChild (LPMEDIAINDEXOBJECT pObject)

Removes the child *pObject* from the objects list of relationships.

AddPropertyType (REFGUID guidPropertySetID, DWORD dwPropertyID, LPCWSTR wszPropertyName, DWORD dwDataType,
LPMEDIAINDEXPROPERTYVALIDATION pValid)

Allows the caller to define a new property type for a "user-defined" property set *guidPropertySetID*. The new property value is identified in *dwPropertyID*, the name of the new property is *wszPropertyName*, the type of data the property stores is identified by *dwDataType*, and the validation parameters are identified by *pValid*. This is the way that properties may be dynamically added to a scheme. The *pValid* parameter is optional, and the *wszPropertyName* parameter can be NULL (but supplying a name is strongly recommended).

Returns: E_MM_DBNOTOPEN if data base not supplied in constructor.
E_MM_PROPEXISTS if specified property set ID / property ID pair already exist.
E_MM_NOSUCHPROPSET if specified property set ID doesn't exist.
E_MM_CANTADDPROPERTY if specified property set exists, but isn't a "user" property set.

GetPropertyType (REFGUID guidPropertySetID, DWORD dwPropertyID, LPWSTR wszPropertyName, DWORD *pdwDataType,
LPMEDIAINDEXPROPERTYVALIDATION *ppValid)

Given the first two parameters identifying a property set *guidPropertySetID* and property type *dwPropertyID*, returns the next three parameters from the data base: the name of the property *wszPropertyName*, the type of data stored by the property *pdwDataType*, and optionally the validation parameters *ppValid*.

Returns: E_MM_DBNOTOPEN if data base not supplied in constructor.
E_INVALIDARG if 'wszPropertyName' or 'pdwDataType' are NULL.
E_MM_NOSUCHPROP if specified property type not found.
E_OUTOFMEMORY if an internal allocation failed.

SetProperty (REFGUID guidPropertySetID, DWORD dwPropertyID, LPCWSTR wszPropertyName, DWORD dwDataType, LPCVOID pvBuffer, DWORD dwBufferSize)

Validates and adds/modifies specified property instance (specified by the property set *guidPropertySetID* and the property type *dwPropertyID*), with the specified characteristics (the name of the property *wszPropertyName*, the type of data stored in the property *dwDataType*, and the data identified by *pvBuffer* of size *dwBufferSize*.
  Returns: E_MM_DBNOTOPEN if data base not supplied in constructor.
     E_INVALIDARG if *pvBuffer* is NULL.
     E_MM_NOSUCHPROP if specified property instance
      (*guidPropertySetID* / *dwPropertyID*) doesn't exist.
     E_MM_INVALIDPROP if specified values don't pass validation as
      indicated in the scheme.

GetProperty (REFGUID guidPropertySetID, DWORD dwPropertyID, LPWSTR wszPropertyName, LPDWORD pdwDataType, LPVOID pvDataBuffer, DWORD dwBufferSize, LPDWORD pdwRequiredSize)

Returns data (the property name *wszPropertyName*, the type of data stored in the property *pdwDataType*) about the specified property instance (specified by the property set *guidPropertySetID* and the property type *dwPropertyID*) into a buffer (identified by *pvDataBuffer* of size *dwBufferSize*). The parameters *pdwDataType*, *pvDataBuffer* and *pdwRequiredSize* are optional return parameters and may be left NULL.
  Returns: E_MM_DBNOTOPEN if data base not supplied in constructor.
     E_MM_NOSUCHPROP if specified property instance
      (*guidPropertySetID* / *dwPropertyID*) doesn't exist.

RemoveProperty (REFGUID guidPropertySetID, DWORD dwPropertyID)

Removes specified property instance (specified by the property set *guidPropertySetID* and the property type *dwPropertyID*) from the data base.
  Returns: E_MM_DBNOTOPEN if data base not supplied in constructor.
     E_MM_NOSUCHPROP if specified property instance
      (*guidPropertySetID* / *dwPropertyID*) doesn't exist.

CreatePropertyValidation (LPMEDIAINDEXPROPERTYVALIDATION *ppValid)

Creates a new instance of a property validation object *ppValid* in memory. Used to populate a property validation object before passing it to other API's. Caller must Release() returned pointer when it is no longer needed.
  Returns: E_POINTER if 'ppValid' is NULL.
     E_OUTOFMEMORY if internal allocation failed.

SetPropertyValidation (REFGUID guidPropertySetID, DWORD dwPropertyID, LPMEDIAINDEXPROPERTYVALIDATION pValid)

Assign validation parameters *pValid* to an existing property (specified by the property set *guidPropertySetID* and the property type *dwPropertyID*). May override existing validation data for the property.

Returns: E_MM_DBNOTOPEN if data base not supplied in constructor.
E_MM_NOSUCHPROPSET if specified property set doesn't exist.
E_MM_NOSUCHPROP if specified property instance (*guidPropertySetID / dwPropertyID*) doesn't exist.

GetPropertyValidation (REFGUID guidPropertySetID, DWORD dwPropertyID, LPMEDIAINDEXPROPERTYVALIDATION *ppValid)

Get validation parameters *ppValid* for an existing property (specified by the property set *guidPropertySetID* and the property type *dwPropertyID*). Caller must Release() returned pointer when it is no longer needed.

Returns: E_MM_DBNOTOPEN if data base not supplied in constructor.
E_MM_NOSUCHPROPSET if specified property set doesn't exist.
E_MM_NOSUCHPROP if specified property instance (*guidPropertySetID / dwPropertyID*) doesn't exist.

BeginPropertyEnumeration (LPCGUID pguidPropertySetID, LPDWORD pdwCount)

Start enumerating actual property instances for the property set specified as *pguidPropertySetID*. If no property set is specified, enumerates all properties. Returns an optional count of properties that will be enumerated in *pdwCount*.

EnumerateProperty (REFGUID guidPropertySetID, LPDWORD pdwPropertyID, LPWSTR wszPropertyName, LPDWORD pdwDataType, LPVOID pvDataBuffer, DWORD dwBufferSize, LPDWORD pdwRequiredSize)

Returns data (the property name *wszPropertyName*, the type of data stored in the property *pdwDataType* and the number of bytes required to store the property *pdwRequiredSize*) about the current property instance (specified by the property set *guidPropertySetID* and the property type *pdwPropertyID*) in the data base into a buffer (identified by *pvDataBuffer* of size *dwBufferSize*).

Returns: E_MM_NOENUMERATION if BeginPropertyEnumeration() has not been called successfully.
E_MM_EOL if no more properties to enumerate.

EndPropertyEnumeration (void)

Ends the property enumeration. Can be called safely even if BeginPropertyEnumeration() has not been called.

IsParentOf (LPMEDIAINDEXOBJECT pObject)
Returns a BOOL value indicating whether the IMediaIndexObject that has the IsParentOf function as a member is a parent of *pObject*.

IsChildOf (LPMEDIAINDEXOBJECT pObject)
Returns a BOOL value indicating whether the IMediaIndexObject that has the IsChildOf function as a member is a child of *pObject*.

GetPropertySetNameFromGUID (REFGUID guidPropertySetID, LPWSTR wszPropertySetName)
Given a GUID of a property set type *guidPropertySetID*, return its type name *wszPropertySetName* from the scheme.
The property set name could alternativley be returned as an optional property of EnumerateProperty.

PropertyValueToWideText (LPVOID pvDataBuffer, DWORD dwDataType, DWORD dwBufferSize, LPWSTR wszPropertyValue, DWORD dwTextCount)
Convert an arbitrary value to a wide string. The first three parameters are inputs defining the data to be converted (the location of the data is identified in *pvDataBuffer*, the type of data is identified in *dwDataType*, and the size of the buffer is identified in *dwBufferSize*). The last two parameters describe the output string: the string *wszPropertyValue* and the total number of wide characters *dwTextCount* in the *wszPropertyValue* buffer (not its size).
    Returns:  E_MM_DBNOTOPEN if data base not supplied in the constructor.
            E_MM_INVALIDARG if *pvDataBuffer* or *wszPropertyValue* is NULL.

PropertyWideTextToValue (LPCWSTR wszPropertyValue, DWORD dwDataType, LPVOID pvDataBuffer, LPDWORD pdwBufferSize)
Convert a wide string to an arbitrary value. *wszPropertyValue* is the string to be converted and *dwDataType* is the data type to return in *pvDataBuffer*. *pdwBufferSize* is the initial size of *pvDataBuffer* in bytes, and on return it contains the actual size of the returned data.
    Returns:  E_MM_DBNOTOPEN if data base not supplied in the constructor.
            E_MM_INVALIDARG if *pvDataBuffer* or *wszPropertyValue* is NULL.

PropertyValueToText (LPVOID pvDataBuffer, DWORD dwDataType, DWORD dwBufferSize, LPTSTR szPropertyValue, DWORD dwTextCount)
Convert an arbitrary value to a multi-byte string. The first three parameters are inputs defining the data to be converted (the location of the data is identified in

*pvDataBuffer*, the type of data is identified in *dwDataType*, and the size of the buffer is identified in *dwBufferSize*). The last two parameters describe the output string: the string *szPropertyValue* and the total number of wide characters *dwTextCount* in the *szPropertyValue* buffer (not its size).
    Returns:  E_MM_DBNOTOPEN if data base not supplied in the constructor.
              E_MM_INVALIDARG if *pvDataBuffer* or *szPropertyValue* is NULL.

PropertyTextToValue (LPCTSTR szPropertyValue, DWORD dwDataType, LPVOID pvDataBuffer, LPDWORD pdwBufferSize)
    Convert a wide string to an arbitrary value. *szPropertyValue* is the string to be converted and *dwDataType* is the data type to return in *pvDataBuffer*. *pdwBufferSize* is the initial size of *pvDataBuffer* in bytes, and on return it contains the actual size of the returned data.
    Returns:  E_MM_DBNOTOPEN if data base not supplied in the constructor.
              E_MM_INVALIDARG if *pvDataBuffer* or *szPropertyValue* is NULL.

ImediaIndexPropertyValidation

Interface used to pass property validation parameters between an application and the index(es). All validation parameters are optional. Validation parameters may be supplied in the original scheme, or added/changed programmatically. Validation parameters are:
        A lowest valid value - Combines with highest value to define a valid range.
        A highest valid value - Combines with lowest value to define a valid range.
        A list of valid values - Mutually exclusive with "lowest" and "highest" values.
        A maximum count of characters (for text-based properties only).
        A flags word. Bits are defined in the PROPVALID enum, described below.
Currently, there are two: the "unique" flag and the "displayname" flag. Unique means that the property value must be unique for all instances of the owning object. Displayname means that the property can be used to display an identifying name for the owning object.

```
typedef enum
{
    propvalid_Nil              =-1,           //invalid value
    propvalid_None             =0,            //No flags enabled
    propvalid_FlagUnique       =0x00000001,   //Value must be unique
    propvalid_FlagDisplayName  =0x00000002,   //field is the displayname (must be string)
} PROPVALID;
```

**GetValidLo (VARIANT *pvarLo)**
    Get the lowest valid value, if any, for the property identified by the instance of the object implementing the IMediaIndexPropertyValidation interface returned as *pvarLo*.

PutValidLo (VARIANT varLo)
    Set the lowest valid value for the property identified by the instance of the object implementing the IMediaIndexPropertyValidation interface as *varLo*. Pass an empty variant (vt == VT_EMPTY) to NULL out this value.

**GetValidHi (VARIANT *pvarHi)**
    Get the highest valid value, if any, for the property identified by the instance of the object implementing the IMediaIndexPropertyValidation interface returned as *pvarHi*.

PutValidHi (VARIANT varHi)
    Set the highest valid value for the property identified by the instance of the object implementing the IMediaIndexPropertyValidation interface as *varHi*. Pass an empty variant (vt == VT_EMPTY) to NULL out this value.

GetValidList (VARIANT ppVar, LPDWORD pcVar)**
    Retrieves the list of valid values. List is returned as an array of VARIANT's in *\*ppVar*, with the array size in *\*pcVar*.

**PutValidList (VARIANT *pVar, DWORD cVar)**
    Sets the list of valid values. List is passed as an array of VARIANT's in *pVar*, with the array size in *cVar*. Overrides any existing list.

GetCchValid (LPDWORD pcch)
    Gets the maximum length *pcch* of a string parameter, if any.

PutCchValid (DWORD cch)
    Sets the maximum length of a string parameter to *cch*.

GetFlags (LPDWORD pFlags)
    Gets the flags word returne d in *pFlags*. Flags are defined in PROPVALID enum.

PutFlags (DWORD flags)
Sets the value of the flags word as *flags*. Flags are defined in PROPVALID enum.

ImediaIndexSearchSink

Interface used for callbacks while a search is underway. Searches are asynchronous, and return each match as it is found. If you never call Search(), this interface will never be called.

OnSearchStarted ()
Called at the start of a search, to allow the client to perform client-specific actions.

OnObjectFound (REFGUID guidObjectType, DWORD dwInstanceID, REFGUID guidPropertySet, DWORD dwPropertyNumber, DWORD dwScore)
Called to return the values of each matched object. Indicates the object and property that matched (as well as the property set to which the property belongs), plus a score rating the "goodness" of the match, on a 0 – 10000 scale. The parameters are:
*guidObjectType:* the type of object that matched.
*dwInstanceID:* which object of type *quidObjectType* matched.
*guidPropertySet:* property set of the property (*dwPropertyNumber*) that matched the search string.
*dwPropertyNumber:* the property that matched the specified search string.
*dwScore:* the score of this particular match, on a 0 – 10000 scale, where 10000 equals 100%.

OnProgress (DWORD dwPercent)
If the client asked for "progress status" in the dwFlags word of the Search() API, this interface will be called at least once. It is called every time the "percent done" value changes from the value previously passed to the client. Values returned are in the range 0 – 100.
This interface also supports an additional efficiency feature. If you asked for "progress status" and the search is likely to be very short, we will not return a zero value through this callback. Thus, you could choose not to display a progress bar at all if a zero value wasn't received, since it would probably just flash immediately up to 100%.

OnSearchCompleted (DWORD dwFound, HRESULT hr)

Called once when the search is finished. Returns the number of matches *dwFound* and the success/failure status of the search in *hr*.

Possible values of *hr* parameter input: S_MM_CANCEL if search cancelled by client.

The invention claimed is:

1. A computer-implemented method comprising:
maintaining meta data associated with a plurality of pieces of content stored on a plurality of pieces of media;
maintaining meta data associated with another plurality of pieces of content, wherein each of the other plurality of pieces of content is a ripped version of a respective one of the plurality of pieces of content in the corresponding one of the plurality of pieces of content;
automatically altering the meta data associated with one of the other plurality of pieces of content in response to the meta data associated with the corresponding one of the plurality of pieces of content being altered;
receiving an identification of a set of content selected from the plurality of pieces of content;
obtaining table of contents information from a disc on which all of the set of content is stored;
generating a disc identifier based at least in part on the table of contents information;
identifying meta data corresponding to the set of content;
generating a new storage structure, corresponding to the disc, and including the identified meta data; and
saving an indication of the altered meta data.

2. A computer-implemented method as recited in claim 1, wherein each of the plurality of pieces of content is a track of a compact disc (CD).

3. A computer-implemented method as recited in claim 1, wherein each of the other plurality of pieces of content is stored on a local hard drive.

4. A computer-implemented method as recited in claim 1, further comprising:
maintaining a set of disc identifiers;
for each disc identifier, maintaining a set of children objects, wherein each of the children objects corresponds to one of the plurality of pieces of content; and
for each of one or more of the individual children objects, maintaining a set of additional objects, wherein each additional object corresponds to one of the other plurality of pieces of content.

5. One or more computer-readable memories containing a computer program that is executable by a processor to perform the acts of:
maintaining meta data associated with a plurality of pieces of content stored on a plurality of pieces of media;
maintaining meta data associated with another plurality of pieces of content, wherein each of the other plurality of pieces of content is a ripped version of a respective one of the plurality of pieces of content in the corresponding one of the plurality of pieces of content;
automatically altering the meta data associated with one of the other plurality of pieces of content in response to the meta data associated with the corresponding one of the plurality of pieces of content being altered;
receiving an identification of a set of content selected from the plurality of pieces of content;
obtaining table of contents information from a disc on which all of the set of content is stored;
generating a disc identifier based at least in part on the table of contents information;
identifying meta data corresponding to the set of content;
generating a new storage structure, corresponding to the disc, and including the identified meta data; and
saving an indication of the altered meta data.

6. One or more computer-readable storage media having stored thereon a plurality of instructions that, when executed by one or more processors of a computer, causes the one or more processors to perform the following acts:
receiving an identification of a change to be made to meta data corresponding to a particular piece of content on a particular piece of media;
changing, based on the identification, meta data corresponding to the particular piece of content;
automatically identifying one or more other pieces of content associated with the particular piece of content, wherein the other pieces of content are ripped versions of the particular piece of content;
changing, based on the identification, meta data corresponding to the one or more other pieces of content;
receiving another identification of a change to be made to meta data, wherein the other identification is a change to be made to one of the other pieces of content;
automatically changing, based on the other identification, the meta data corresponding to the one of the other pieces of content;
automatically changing, based on the identification, the meta data corresponding to the particular piece of content;
automatically changing, based on the other identification, the meta data corresponding to the others of the one or more other pieces of content; and
saving an indication of the changed meta data.

7. One or more computer-readable storage media as recited in claim 6, wherein the particular piece of content on the particular piece of media comprises a particular song on a particular compact disc (CD).

8. One or more computer-readable storage media as recited in claim 6, wherein the identification includes new meta data and wherein changing the meta data corresponding to the particular piece of content comprises overwriting any previous meta data corresponding to the particular piece of content with the new meta data.

9. One or more computer-readable storage media as recited in claim 6, wherein the particular piece of content comprises an audio track and wherein the other pieces of content comprise different versions of the audio track.

10. One or more computer-readable storage media as recited in claim 6, wherein original meta data associated with the particular piece of content comprises meta data received from a remote server, and wherein the change to be made to the meta data corresponding to the particular piece of content comprises new meta data received from a user.

11. One or more computer-readable storage media as recited in claim 9, wherein the plurality of instructions further causes the one or more processors to perform the following acts:
maintaining an indication of a source of the change to the meta data corresponding to the particular piece of content;
maintaining an indication of a source of the change to the meta data corresponding to each of the one or more other pieces of content;
automatically receiving an identification of another change to be made to meta data corresponding to the particular piece of content;
checking whether the source of the change to the meta data corresponding to the particular piece of content was a user;
changing, based on the identification of the other change, meta data corresponding to the particular piece of content if the source of the change to the meta data corresponding to the particular piece of content was the user;

checking whether the source of the change to the meta data corresponding to the one or more other pieces of contents was the user; and automatically changing, based on the identification of the other change, meta data corresponding to the one or more other pieces of content if the source of the change to the meta data corresponding to the one or more other pieces of contents was the user.

12. A system comprising:

a disc drive configured to have a removable disc inserted therein, wherein the removable disc includes a plurality of pieces of content;

a local storage device configured to store another plurality of pieces of content, wherein each of the other plurality of pieces of content corresponds to one of the plurality of pieces of content and is a copied version of the data in the corresponding one of the plurality of pieces of content; and a meta data management module, configured to:

maintain meta data associated with a plurality of pieces of content stored on the removable disc;

maintain meta data associated with another plurality of pieces of content, wherein each of the other plurality of pieces of content is a ripped version of a respective one of the plurality of pieces of content in the corresponding one of the plurality of pieces of content;

automatically alter the meta data associated with one of the other plurality of pieces of content in response to the meta data associated with the corresponding one of the plurality of pieces of content being altered;

receive an identification of a set of content selected from the plurality of pieces of content;

obtain table of contents information from the disc, wherein the disc stores all of the set of content;

generate a disc identifier based at least in part on the table of contents information;

identify meta data corresponding to the set of content;

generate a new storage structure, corresponding to the disc, and including the identified meta data; and save an indication of the altered meta data.

13. A system as recited in claim 12, wherein the local storage device is further configured to store both meta data associated with the plurality of pieces of content and meta data associated with the other plurality of pieces of content.

14. One or more computer-readable storage media having stored thereon a plurality of instructions that, when executed by one or more processors of a computer, cause the one or more processors to perform the following acts:

receiving an identification of a plurality of tracks on a disc;

obtaining table of contents information from the disc;

generating a disc identifier based at least in part on the table of contents information;

accessing a local meta data store to identify meta data corresponding to the tracks copied on another disc;

generating a new storage structure, corresponding to the disc, and including the identified meta data;

automatically receiving another identification of a change to be made to meta data, wherein the other identification is a change to be made to one of the other pieces of content;

changing, based on the other identification, the meta data corresponding to the one of the other pieces of content;

changing, based on the identification, the meta data corresponding to the particular piece of content;

changing, based on the other identification, the meta data corresponding to the others of the one or more other pieces of content; and saving an indication of a relationship between the plurality of tracks on the disc and corresponding to tracks associated with the other disc.

15. A computer-implemented method comprising:

receiving a notification of a new piece of media, wherein the new piece of media includes a plurality of pieces of content that are selected by a user for inclusion on the new piece of media, and wherein the user selection is based on one or more other pieces of content associated with one or more other pieces of media, and wherein further the one or more other pieces of content include copied versions of the plurality of pieces of content;

generating a media identifier corresponding to the new piece of media;

automatically identifying, from a meta data store, meta data corresponding to the plurality of pieces of content and associated with the one or more other pieces of content;

saving, as meta data corresponding to the new piece of media, the identified meta data;

receiving an identification of a set of content selected from the plurality of pieces of content;

obtaining table of contents information from a disc on which all of the set of content is stored;

generating a disc identifier based at least in part on the table of contents information;

identifying meta data corresponding to the set of content;

generating a new storage structure, corresponding to the disc, and including the identified meta data; and saving an indication of a relationship between content on the new piece of media and the corresponding one or more other pieces of content.

16. A computer-implemented method as recited in claim 15, wherein the new piece of media comprises a compact disc (CD).

17. A computer-implemented method as recited in claim 15, wherein each of the plurality of pieces of content comprises a song.

18. A computer-implemented method as recited in claim 15, wherein generating the media identifier comprises:

obtaining table of contents information for the new piece of media; and calculating, based at least in part on the table of contents information, the media identifier corresponding to the new piece of media.

19. One or more computer-readable memories containing a computer program that is executable by a processor to perform acts of:

receiving a notification of a new piece of media, wherein the new piece of media includes a plurality of pieces of content that are selected by a user for inclusion on the new piece of media, and wherein the user selection is based on one or more other pieces of content associated with one or more other pieces of media, and wherein further the one or more other pieces of content include copied versions of the plurality of pieces of content;

generating a media identifier corresponding to the new piece of media;

automatically identifying, from a meta data store, meta data corresponding to the plurality of pieces of content and associated with the one or more other pieces of content;

saving, as meta data corresponding to the new piece of media, the identified meta data;

receiving an identification of a set of content selected from the plurality of pieces of content;
obtaining table of contents information from a disc on which all of the set of content is stored;
generating a disc identifier based at least in part on the table of contents information;
identifying meta data corresponding to the set of content;
generating a new storage structure, corresponding to the disc, and including the identified meta data; and
saving an indication of a relationship between content on the new piece of media and the corresponding one or more other pieces of content.

20. A computer-implemented method of managing meta data corresponding to media content, the method comprising:
maintaining a set of disc identifiers;
for each disc identifier, maintaining a set of corresponding children objects, wherein each of the children objects corresponds to a track on the disc associated with the disc identifier;
for each of one or more of the individual children objects, maintaining a set of additional objects, wherein each additional object corresponds to a file associated with the track corresponding to the child object;
associating, for each of the one or more individual children objects, the set of additional objects with the child object, wherein the set of additional objects correspond respectively to a copy of an associated one of the tracks;
receiving an indication to change meta data associated with one track on the disc;
automatically altering, in response to the indication, meta data associated with the child object corresponding to the one track;
automatically altering, in response to the indication, meta data associated with the additional object corresponding to the child object corresponding to the track; and
propagating, to the set of additional objects, any changes made to meta data corresponding to the child object.

21. A computer-implemented method as recited in claim 20, further comprising associating meta data with each child object and each additional object.

22. A computer-implemented method as recited in claim 20, wherein one or more disc identifiers in the set of disc identifiers is a compact disc (CD) identifier.

23. A computer-implemented method as recited in claim 20, wherein one or more disc identifiers in the set of disc identifiers is a digital versatile disc (DVD) identifier.

24. One or more computer-readable memories containing a computer program that is executable by a processor to manage meta data corresponding to media content by performing acts of:
maintaining a set of disc identifiers;
for each disc identifier, maintaining a set of corresponding children objects, wherein each of the children objects corresponds to a track on the disc associated with the disc identifier;
for each of one or more of the individual children objects, maintaining a set of additional objects, wherein each additional object corresponds to a file associated with the track corresponding to the child object;
automatically associating, for each of the one or more individual children objects, the set of additional objects with the child object, wherein the set of additional objects correspond respectively to a copy of an associated one of the tracks;
receiving an indication to change meta data associated with one track on the disc;
automatically altering, in response to the indication, meta data associated with the child object corresponding to the one track;
automatically altering, in response to the indication, meta data associated with the additional object corresponding to the child object corresponding to the track; and
propagating, to the set of additional objects, any changes made to meta data corresponding to the child object.

25. One or more computer-readable memories containing a computer program that is executable by a processor to perform the acts of:
maintaining a set of identifiers;
for each disc identifier, maintaining a set of corresponding children objects, wherein each of the children objects corresponds to a content track on the disc associated with the disc identifier;
for each of one or more of the individual children objects, maintaining a set of additional objects, wherein each additional object corresponds to a file associated with the content track corresponding to the child object;
automatically associating, for each of the one or more individual children
objects, the set of additional objects with the child object, wherein the set of
additional objects correspond respectively to a copy of an associated one of
the content tracks; and receiving an indication to change meta data
associated with one track on the disc;
automatically altering, in response to the indication, meta data associated with the child object corresponding to the one track;
automatically altering, in response to the indication, meta data associated with the additional object corresponding to the child object corresponding to the track; and
propagating, to the set of additional objects, any changes made to meta data corresponding to the child object;
wherein the meta data is stored on a computer-readable medium having a data structure comprising:
a set of entries identifying objects;
another set of entries identifying relationships between selected ones of the objects identified in the set with selected others of the objects, wherein the selected others of the objects are copies of corresponding ones of the objects; and
an additional set of entries identifying meta data associated with individual objects.

26. A computer-readable memory as recited in claim 25, wherein each set of entries is implemented as a different table in a database.

27. A computer-readable memory as recited in claim 25, wherein the set of entries also associates the objects with identifiers.

28. A computer-readable memory as recited in claim 25, wherein the other set of entries identifies the relationships based on the identifiers associated with the objects.

29. A computer-implemented method comprising:
maintaining meta data associated with a plurality of pieces of content stored on a plurality of pieces of media;
maintaining meta data associated with another plurality of pieces of content, wherein each of the other plurality of pieces of content is a ripped version of a respective one of the plurality of pieces of content in the corresponding one of the plurality of pieces of content;

automatically altering the meta data associated with one of the other plurality of pieces of content in response to the meta data associated with the corresponding one of the plurality of pieces of content being altered;

receiving an indication of a change to be made to meta data corresponding to the content;

identifying a file associated with the content, wherein the file stores a copied version of the data in the content;

changing, based on the indication, meta data corresponding to the content;

changing, based on the indication, meta data corresponding to the file; and saving an indication of the altered meta data.

30. A computer-implemented method as recited in claim 29, wherein the content track comprises an audio track.

31. A computer-implemented method as recited in claim 29, wherein the content track comprises an audio/video track.

32. A computer-implemented method as recited in claim 29, wherein the content track comprises a video track.

33. A computer-implemented method as recited in claim 29, wherein the particular medium comprises a particular compact disc (CD).

34. A computer-implemented method as recited in claim 29, wherein the particular medium comprises a particular digital versatile disc (DVD).

35. A computer-implemented method as recited in claim 29, wherein the particular medium comprises a particular optical disc.

36. One or more computer-readable memories containing a computer program that is executable by a processor to perform acts of:

maintaining meta data associated with a plurality of pieces of content stored on a plurality of pieces of media;

maintaining meta data associated with another plurality of pieces of content, wherein each of the other plurality of pieces of content is a ripped version of a respective one of the plurality of pieces of content in the corresponding one of the plurality of pieces of content;

automatically altering the meta data associated with one of the other plurality of pieces of content in response to the meta data associated with the corresponding one of the plurality of pieces of content being altered;

receiving an indication of a change to be made to meta data corresponding to the content;

identifying a file associated with the content track, wherein the file stores a copied version of the data in the content;

automatically changing, based on the indication, meta data corresponding to the content;

automatically changing, based on the indication, meta data corresponding to the file; and saving an indication of the altered meta data.

37. One or more computer-readable memories containing a computer program that is executable by a processor to manage meta data corresponding to media content by performing acts of:

maintaining a set of disc identifiers;

for each disc identifier, maintaining a set of corresponding children objects, wherein each of the children objects corresponds to a track on the disc associated with the disc identifier, wherein one or more disc identifiers in the set of disc identifiers is one of a compact disc (CD) identifier and a digital versatile disc (DVD) identifier, wherein the disc identifier is formed using 64-bit Cyclical Redundancy Checking (CRC) of portions of the DVD comprising a first 64 Kb of the DVD including one or more of: video_ts.ifo and vts_01_0.ifo;

for each of one or more of the individual children objects, maintaining a set of additional objects, wherein each additional object corresponds to a file associated with the track corresponding to the child object;

automatically associating, for each of the one or more individual children objects, the set of additional objects with the child object, wherein the set of additional objects correspond respectively to a copy of an associated one of the tracks;

propagating, to the set of additional objects, any changes made to meta data corresponding to the child object; and receiving an indication to change meta data associated with one track on the disc;

automatically altering, in response to the indication, meta data associated with the child object corresponding to the one track;

automatically altering, in response to the indication, meta data associated with the additional object corresponding to the child object corresponding to the track; and saving an indication of a relationship between the plurality of tracks on the disc and corresponding to tracks associated with the other disc.

38. A memory as recited in claim 37, the computer program further being executable to cause the processor to perform acts comprising associating meta data with each child object and each additional object.

39. A memory as recited in claim 37, wherein the disc identifier is formed using 64-bit CRC of portions of the DVD.

* * * * *